(12) United States Patent
Hendry

(10) Patent No.: US 12,184,836 B2
(45) Date of Patent: Dec. 31, 2024

(54) IMAGE OR VIDEO CODING BASED ON NAL UNIT-ASSOCIATED INFORMATION

(71) Applicant: LG Electronics Inc., Seoul (KR)

(72) Inventor: Hendry Hendry, Seoul (KR)

(73) Assignee: LG Electronics Inc., Seoul (KR)

( * ) Notice: Subject to any disclaimer, the term of this patent is extended or adjusted under 35 U.S.C. 154(b) by 127 days.

(21) Appl. No.: 17/788,471

(22) PCT Filed: Dec. 10, 2020

(86) PCT No.: PCT/KR2020/018062
§ 371 (c)(1),
(2) Date: Jun. 23, 2022

(87) PCT Pub. No.: WO2021/132964
PCT Pub. Date: Jul. 1, 2021

(65) Prior Publication Data
US 2023/0045490 A1    Feb. 9, 2023

Related U.S. Application Data

(60) Provisional application No. 62/953,110, filed on Dec. 23, 2019.

(51) Int. Cl.
*H04N 19/105* (2014.01)
*H04N 19/169* (2014.01)
*H04N 19/174* (2014.01)
*H04N 19/70* (2014.01)

(52) U.S. Cl.
CPC ......... *H04N 19/105* (2014.11); *H04N 19/174* (2014.11); *H04N 19/188* (2014.11); *H04N 19/70* (2014.11)

(58) Field of Classification Search
CPC .. H04N 19/105; H04N 19/174; H04N 19/188; H04N 19/70; H04N 19/44
USPC ....................................................... 375/240.02
See application file for complete search history.

(56) References Cited

U.S. PATENT DOCUMENTS

| | | | |
|---|---|---|---|
| 2014/0086333 A1* | 3/2014 | Wang | H04N 21/235 |
| | | | 375/240.26 |
| 2014/0092964 A1* | 4/2014 | Ugur | H04N 19/107 |
| | | | 375/240.12 |
| 2021/0409780 A1* | 12/2021 | Wang | H04N 19/188 |

(Continued)

FOREIGN PATENT DOCUMENTS

| | | |
|---|---|---|
| KR | 20130118798 | 10/2013 |
| KR | 20140133827 | 11/2014 |

(Continued)

OTHER PUBLICATIONS

Bross et al., "Versatile Video Coding (Draft 7)," Joint Video Experts Team (JVET) of ITU-T SG 16 WP 3 and ISO/IEC JTC 1/SC 29/WG 11, Document: JVET-P2001-vE, 16th Meeting: Geneva, CH, Oct. 1-11, 2019, 489 pages.

*Primary Examiner* — Behrooz M Senfi
(74) *Attorney, Agent, or Firm* — Fish & Richardson P.C.

(57) ABSTRACT

According to the disclosure of the present document, on the basis of NAL unit type-associated information on whether a picture has mixed NAL unit types, NAL unit types for slices within the picture can be determined, and for the picture having the mixed NAL unit types, not only IRAP but also a form mixed with NAL units of other types can be provided.

5 Claims, 21 Drawing Sheets

(56) References Cited

U.S. PATENT DOCUMENTS

2022/0109861 A1* 4/2022 Hannuksela ......... H04N 19/167
2023/0030394 A1* 2/2023 Hendry ................ H04N 19/105

FOREIGN PATENT DOCUMENTS

KR    101739748    5/2017
KR    102010100    8/2019

* cited by examiner

IMAGE OR VIDEO CODING BASED ON NAL UNIT-ASSOCIATED INFORMATION

CROSS-REFERENCE TO RELATED APPLICATIONS

This application is a National Stage application under 35 U.S.C. § 371 of International Application No. PCT/KR2020/018062, filed on Dec. 10, 2020, which claims the benefit of U.S. Provisional Application No. 62/953,110, filed on Dec. 23, 2019. The disclosures of the prior applications are hereby incorporated by reference herein in their entirety.

BACKGROUND OF DISCLOSURE

Field of the disclosure

The present technology relates to video or image coding, for example, to a network abstraction layer (NAL) unit related information-based coding technology.

Related Art

The demands for high-resolution and high-quality images and video, such as an ultra high definition (UHD) image and video of 4K or 8K or more, are recently increasing in various fields. As image and video data become high resolution and high quality, the amount of information or the number of bits that is relatively transmitted is increased compared to the existing image and video data. Accordingly, if image data is transmitted using a medium, such as the existing wired or wireless wideband line, or image and video data are stored using the existing storage medium, transmission costs and storage costs are increased.

Furthermore, interests and demands for immersive media, such as virtual reality (VR), artificial reality (AR) content or a hologram, are recently increasing. The broadcasting of an image and video having image characteristics different from those of real images, such as game images, is increasing.

Accordingly, there is a need for a high-efficiency image and video compression technology in order to effectively compress and transmit or store and playback information of high-resolution and high-quality images and video having such various characteristics.

In addition, there is a need for a method for improving the efficiency of image/video coding, and for this, a method for effectively signaling and coding information related to a network abstraction layer (NAL) unit is necessary.

SUMMARY

This document is to provide a method and apparatus for improving video/image coding efficiency.

This document is also to provide a method and apparatus for improving video/image coding efficiency based on NAL unit-related information.

This document is also to provide a method and apparatus for increasing video/image coding efficiency for a picture having a mixed (mixed) NAL unit type.

This document is also to provide a method and apparatus for allowing reference picture list related information to be present or to be signaled for a slice in a picture having a specific NAL unit type with respect to a picture having mixed NAL unit types.

According to an embodiment of this document, NAL unit types for slices in a picture may be determined based on NAL unit type related information on whether the picture has mixed NAL unit types. For example, based on the NAL unit type related information for the picture having the mixed NAL unit types, the first NAL unit for the first slice of the picture and the second NAL unit for the second slice of the picture may have different NAL unit types. Alternatively, based on the NAL unit type related information for the picture having no mixed NAL unit types, the first NAL unit for the first slice of the picture and the second NAL unit for the second slice of the picture may have the same NAL unit type.

According to an embodiment of this document, based on a case in which a picture is allowed to have the mixed NAL unit types, for a slice having a specific NAL unit type in the picture, information related to signaling a reference picture list may be present.

According to an embodiment of the present document, a video/image decoding method performed by a decoding apparatus is provided. The video/image decoding method may include the method disclosed in the embodiments of this document.

According to an embodiment of the present document, a decoding apparatus for performing video/image decoding is provided. The decoding apparatus may include the method disclosed in the embodiments of this document.

According to an embodiment of the present document, a video/image encoding method performed by an encoding apparatus is provided. The video/image encoding method may include the method disclosed in the embodiments of this document.

According to an embodiment of the present document, an encoding apparatus for performing video/image encoding is provided. The encoding apparatus may include the method disclosed in the embodiments of this document.

According to an embodiment of the present document, a computer-readable digital storage medium storing encoded video/image information generated according to the video/image encoding method disclosed in at least one of the embodiments of this document is provided.

According to an embodiment of the present document, a computer-readable digital storage medium storing encoded information or encoded video/image information causing a decoding apparatus to perform the video/image decoding method disclosed in at least one of the embodiments of this document is provided.

The present document may have various effects. For example, according to an embodiment of the present document, it is possible to improve overall image/video compression efficiency. In addition, according to an embodiment of this document, video/image coding efficiency may be increased based on NAL unit-related information. Additionally, according to an embodiment of this document, video/image coding efficiency for a picture having mixed NAL unit types can be increased. In addition, according to an embodiment of this document, reference picture list related information can be effectively signaled and coded for a picture having mixed NAL unit types. Additionally, according to an embodiment of this document, by allowing a picture including a leading picture NAL unit type (e.g., RASL_NUT, RADL_NUT) and other non-IRAP NAL unit types (e.g., TRAIL_NUT, STSA, NUT) in a mixed form, for a picture having mixed NAL unit types, it is possible to provide a form mixed not only with IRAP but also with other types of NAL units, and through this, it is possible to have more flexible characteristics.

Effects that can be obtained through a detailed example of the present document are not limited to the effects enumerated above. For example, there may be various technical effects that can be understood or induced by a person having ordinary skill in the related art from the present document. Accordingly, the detailed effects of the present document are not limited to those explicitly stated in the present document, but may include various effects that can be understood or induced from the technical features of the present document.

DESCRIPTION OF EMBODIMENTS

Figure 1:
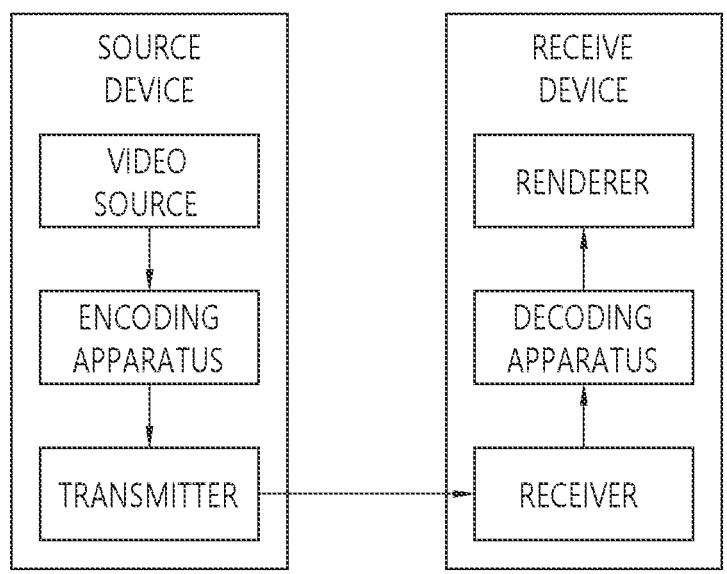
FIG. 1 briefly illustrates an example of a video/image coding device to which embodiments of the present document are applicable.

This document may be modified in various ways and may have various embodiments, and specific embodiments will be illustrated in the drawings and described in detail. However, this does not intend to limit this document to the specific embodiments. Terms commonly used in this specification are used to describe a specific embodiment and is not used to limit the technical spirit of this document. An expression of the singular number includes plural expressions unless evidently expressed otherwise in the context. A term, such as "include" or "have" in this specification, should be understood to indicate the existence of a characteristic, number, step, operation, element, part, or a combination of them described in the specification and not to exclude the existence or the possibility of the addition of one or more other characteristics, numbers, steps, operations, elements, parts or a combination of them.

Meanwhile, elements in the drawings described in this document are independently illustrated for convenience of description related to different characteristic functions. This does not mean that each of the elements is implemented as separate hardware or separate software. For example, at least two of elements may be combined to form a single element, or a single element may be divided into a plurality of elements. An embodiment in which elements are combined and/or separated is also included in the scope of rights of this document unless it deviates from the essence of this document.

In this document, "A or B" may mean "only A", "only B" or "both A and B". In other words, "A or B" in this document may be interpreted as "A and/or B". For example, in this document "A, B or C" means "only A", "only B", "only C", or "any combination of A, B and C".

A slash (/) or comma (,) used in this document may mean "and/or". For example, "A/B" may mean "A and/or B". Accordingly, "A/B" may mean "only A", "only B", or "both A and B". For example, "A, B, C" may mean "A, B, or C".

In this document, "at least one of A and B" may mean "only A", "only B" or "both A and B". Also, in this document, the expression "at least one of A or B" or "at least one of A and/or B" means "at least one It can be interpreted the same as "at least one of A and B".

Also, in this document, "at least one of A, B and C" means "only A", "only B", "only C", or "A, B and C" Any combination of A, B and C". Also, "at least one of A, B or C" or "at least one of A, B and/or C" means may mean "at least one of A, B and C".

Also, parentheses used in this document may mean "for example". Specifically, when "prediction (intra prediction)" is indicated, "intra prediction" may be proposed as an example of "prediction". In other words, "prediction" in this document is not limited to "intra prediction", and "intra prediction" may be proposed as an example of "prediction". Also, even when "prediction (ie, intra prediction)" is indicated, "intra prediction" may be proposed as an example of "prediction".

The present document relates to video/image coding. For example, a method/embodiment disclosed in the present document may be applied to a method disclosed in the versatile video coding (VVC) standard. In addition, a method/embodiment disclosed in the present document may be applied to a method disclosed in the essential video coding (EVC) standard, the AOMedia Video 1 (AV1) standard, the 2nd generation of audio video coding standard (AVS2) or the next generation video/image coding standard (e.g., H.267, H.268, or the like).

The present document suggests various embodiments of video/image coding, and the above embodiments may also be performed in combination with each other unless otherwise specified.

In the present document, a video may refer to a series of images over time. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles. A tile is a rectangular region of CTUs within a particular tile column and a particular tile row in a picture (A tile is a rectangular region of CTUs within a particular tile column and a particular tile row in a picture). The tile column is a rectangular region of CTUs, which has a height equal to the height of the picture and a width that may be specified by syntax elements in the picture parameter set (The tile column is a rectangular region of CTUs having a height equal to the height of the picture and a width specified by syntax elements in the picture parameter set). The tile row is a rectangular region of CTUs, which has a width specified by syntax elements in the picture parameter set and a height that may be equal to the height of the picture (The tile row is a rectangular region of CTUs having a height specified by syntax elements in the picture parameter set and a width equal to the width of the picture). A tile scan may represent a specific sequential ordering of CTUs partitioning a picture, and the CTUs may be ordered consecutively in a CTU raster scan in a tile, and tiles in a picture may be ordered consecutively in a raster scan of the tiles of the picture (A tile scan is a specific sequential ordering of CTUs partitioning a picture in which the CTUs are ordered consecutively in CTU raster scan in a tile whereas tiles in a picture are ordered consecutively in a raster scan of the tiles of the picture). A slice includes an integer number of complete tiles or an integer number of consecutive complete CTU rows within a tile of a picture that may be exclusively contained in a single NAL unit.

Meanwhile, one picture may be divided into two or more subpictures. A subpicture may be a rectangular region of one or more slices within a picture.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

Also, in this document, at least one of quantization/dequantization and/or transform/inverse transform may be omitted. When the quantization/dequantization is omitted, the quantized transform coefficient may be referred to as a transform coefficient. When the transform/inverse transform is omitted, transform coefficients may be called coefficients or residual coefficients, or may still be called transform coefficients for the sake of uniformity of expression.

In this document, a quantized transform coefficient and a transform coefficient may be referred to as a transform coefficient and a scaled transform coefficient, respectively. In this case, the residual information may include information about the transform coefficient(s), and the information about the transform coefficient(s) may be signaled through a residual coding syntax. Transform coefficients may be derived based on residual information (or information about transform coefficient(s)), and scaled transform coefficients may be derived through inverse transform (scaling) on the transform coefficients. Residual samples may be derived based on an inverse transform (transform) for the scaled transform coefficients. This may be applied/expressed in other parts of this document as well.

Technical features that are individually described in one drawing in this document may be implemented individually or may be implemented at the same time.

Hereinafter, preferred embodiments of this document are described more specifically with reference to the accompanying drawings. Hereinafter, in the drawings, the same reference numeral is used in the same element, and a redundant description of the same element may be omitted.

FIG. 1 illustrates an example of a video/image coding system to which the embodiments of the present document may be applied.

Referring to FIG. 1, a video/image coding system may include a source device and a reception device. The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of processes such as prediction, transform, and quantization for compaction and coding efficiency. The encoded data (encoded video/image information) may be output in the form of a bitstream.

The transmitter may transmit the encoded video/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of processes such as dequantization, inverse transform, and prediction corresponding to the operation of the encoding apparatus.

The renderer may render the decoded video/image. The rendered video/image may be displayed through the display.

Figure 2:
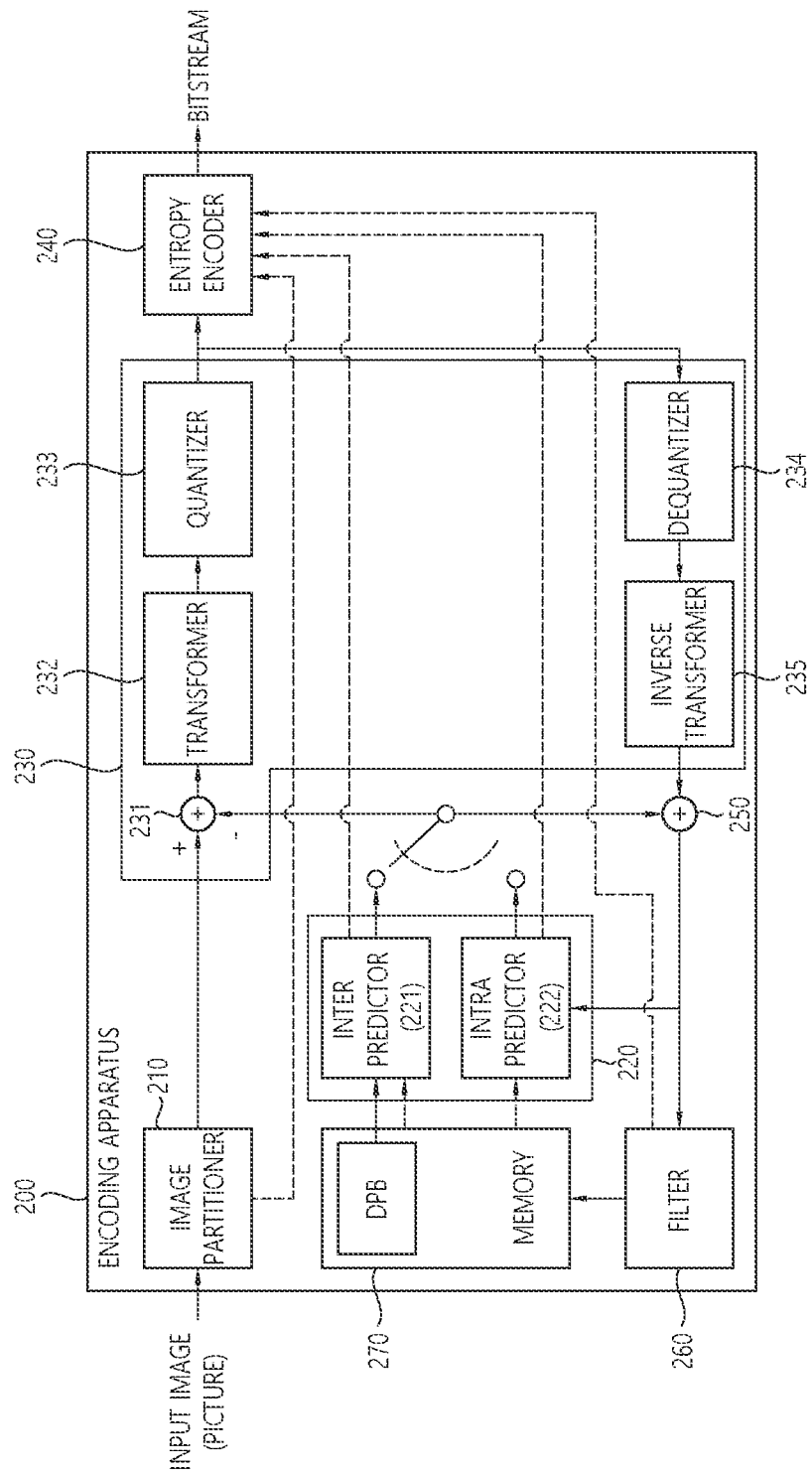
FIG. 2 is a schematic diagram illustrating a configuration of a video/image encoding apparatus to which the embodiment(s) of the present document may be applied.

FIG. 2 is a diagram schematically illustrating a configuration of a video/image encoding apparatus to which the embodiments of the present document may be applied. Hereinafter, what is referred to as the encoding apparatus may include an image encoding apparatus and/or a video encoding apparatus.

Referring to FIG. 2, the encoding apparatus 200 may include and be configured with an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be configured by one or more hardware components (e.g., encoder chipsets or processors) according to an embodiment. In addition, the memory 270 may include a decoded picture buffer (DPB), and may also be configured by a digital storage medium. The hardware component may further include the memory 270 as an internal/external component.

The image partitioner 210 may split an input image (or, picture, frame) input to the encoding apparatus 200 into one or more processing units. As an example, the processing unit may be called a coding unit (CU). In this case, the coding unit may be recursively split according to a Quad-tree binary-tree ternary-tree (QTBTTT) structure from a coding tree unit (CTU) or the largest coding unit (LCU). For example, one coding unit may be split into a plurality of coding units of a deeper depth based on a quad-tree structure, a binary-tree structure, and/or a ternary-tree structure. In this case, for example, the quad-tree structure is first applied and the binary-tree structure and/or the ternary-tree structure may be later applied. Alternatively, the binary-tree structure may also be first applied. A coding process according to the present document may be performed based on a final coding unit which is not split any more. In this case, based on coding efficiency according to image characteristics or the like, the maximum coding unit may be directly used as the final coding unit, or as necessary, the coding unit may be recursively split into coding units of a deeper depth, such that a coding unit having an optimal size may be used as the final coding unit. Here, the coding process may include a process such as prediction, transform, and reconstruction to be described later. As another example, the processing unit may further include a prediction unit (PU) or a transform unit (TU). In this case, each of the prediction unit and the transform unit may be split or partitioned from the aforementioned final coding unit. The prediction unit may be a unit of sample prediction, and the transform unit may be a unit for inducing a transform coefficient and/or a unit for inducing a residual signal from the transform coefficient.

The unit may be interchangeably used with the term such as a block or an area in some cases. Generally, an M×N block may represent samples composed of M columns and N rows or a group of transform coefficients. The sample may generally represent a pixel or a value of the pixel, and may also represent only the pixel/pixel value of a luma component, and also represent only the pixel/pixel value of a chroma component. The sample may be used as the term corresponding to a pixel or a pel configuring one picture (or image).

The encoding apparatus 200 may generate a residual signal (residual block, residual sample array) by subtracting a predicted signal (predicted block, prediction sample array) output from the inter predictor 221 or the intra predictor 222 from the input image signal (original block, original sample array), and the generated residual signal is transmitted to the transformer 232. In this case, as illustrated, the unit for subtracting the predicted signal (predicted block, prediction sample array) from the input image signal (original block, original sample array) within an encoder 200 may be called the subtractor 231. The predictor may perform prediction for a block to be processed (hereinafter, referred to as a current block), and generate a predicted block including prediction samples of the current block. The predictor may determine whether intra prediction is applied or inter prediction is applied in units of the current block or the CU. The predictor may generate various information about prediction, such as prediction mode information, to transfer the generated information to the entropy encoder 240 as described later in the description of each prediction mode. The information about prediction may be encoded by the entropy encoder 240 to be output in a form of the bitstream.

The intra predictor 222 may predict a current block with reference to samples within a current picture. The referenced samples may be located neighboring to the current block, or may also be located away from the current block according to the prediction mode. The prediction modes in the intra prediction may include a plurality of non-directional modes and a plurality of directional modes. The non-directional mode may include, for example, a DC mode or a planar mode. The directional mode may include, for example, 33 directional prediction modes or 65 directional prediction modes according to the fine degree of the prediction direction. However, this is illustrative and the directional prediction modes which are more or less than the above number may be used according to the setting. The intra predictor 222 may also determine the prediction mode applied to the current block using the prediction mode applied to the neighboring block.

The inter predictor 221 may induce a predicted block of the current block based on a reference block (reference sample array) specified by a motion vector on a reference picture. At this time, in order to decrease the amount of motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. The reference picture including the reference block and the reference picture including the temporal neighboring block may also be the same as each other, and may also be different from each other. The temporal neighboring block may be called the name such as a collocated reference block, a collocated CU (colCU), or the like, and the reference picture including the temporal neighboring block may also be called a collocated picture (colPic). For example, the inter predictor 221 may configure a motion information candidate list based on the neighboring blocks, and generate information indicating what candidate is used to derive the motion vector and/or the reference picture index of the current block. The inter prediction may be performed based on various prediction modes, and for example, in the case of a skip mode and a merge mode, the inter predictor 221 may use the motion information of the neighboring block as the motion information of the current block. In the case of the skip mode, the residual signal may not be transmitted unlike the merge mode. A motion vector prediction (MVP) mode may indicate the motion vector of the current block by using the motion vector of the neighboring block as a motion vector predictor, and signaling a motion vector difference.

The predictor 200 may generate a predicted signal based on various prediction methods to be described later. For example, the predictor may not only apply the intra prediction or the inter prediction for predicting one block, but also simultaneously apply the intra prediction and the inter prediction. This may be called a combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present document. The palette mode may be regarded as an example of intra coding or intra prediction. When the palette mode is applied, a sample value in a picture may be signaled based on information on a palette index and a palette table.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients to transmit the quantized transform coefficients to the entropy encoder 240, and the entropy encoder 240 may encode the quantized signal (information about the quantized transform coefficients) to the encoded quantized signal to the bitstream. The information about the quantized transform coefficients may be called residual information. The quantizer 233 may rearrange the quantized transform coefficients having a block form in a one-dimensional vector form based on a coefficient scan order, and also generate the information about the quantized transform coefficients based on the quantized transform coefficients of the one dimensional vector form. The entropy encoder 240 may perform various encoding methods, for example, such as an exponential Golomb coding, a context-adaptive variable length coding (CAVLC), and a context-adaptive binary arithmetic coding (CABAC). The entropy encoder 240 may also encode information (e.g., values of syntax elements and the like) necessary for reconstructing video/image other than the quantized transform coefficients together or separately. The encoded information (e.g., encoded video/image information) may be transmitted or stored in units of network abstraction layer (NAL) unit in a form of the bitstream. The video/image information may further include information about various parameter sets such as an adaptation parameter set (APS), a picture parameter set (PPS), a sequence parameter set (SPS), or a video parameter set (VPS). In addition, the video/image information may further include general constraint information. The signaled/transmitted information and/or syntax elements to be described later in the present document may be encoded through the aforementioned encoding process and thus included in the bitstream. The bitstream may be transmitted through a network, or stored in a digital storage medium. Here, the network may include a broadcasting network and/or a communication network, or the like, and the digital storage medium may include various storage media such as USB, SD, CD, DVD, Blue-ray, HDD, and SSD. A transmitter (not illustrated) for transmitting the signal output from the entropy encoder 240 and/or a storage (not illustrated) for storing the signal may be configured as the internal/external elements of the encoding apparatus 200, or the transmitter may also be included in the entropy encoder 240.

The quantized transform coefficients output from the quantizer 233 may be used to generate a predicted signal. For example, the dequantizer 234 and the inverse transformer 235 apply dequantization and inverse transform to the quantized transform coefficients, such that the residual signal (residual block or residual samples) may be reconstructed. The adder 250 adds the reconstructed residual signal to the predicted signal output from the inter predictor 221 or the intra predictor 222, such that the reconstructed signal (reconstructed picture, reconstructed block, reconstructed sample array) may be generated. As in the case where the skip mode is applied, if there is no residual for the block to be processed, the predicted block may be used as the reconstructed block. The adder 250 may be called a reconstructor or a reconstructed block generator. The generated reconstructed signal may be used for the intra prediction of the next block to be processed within the current picture, and as described later, also used for the inter prediction of the next picture through filtering.

Meanwhile, a luma mapping with chroma scaling (LMCS) may also be applied in a picture encoding and/or reconstruction process.

The filter 260 may apply filtering to the reconstructed signal, thereby improving subjective/objective image qualities. For example, the filter 260 may apply various filtering methods to the reconstructed picture to generate a modified reconstructed picture, and store the modified reconstructed picture in the memory 270, specifically, the DPB of the memory 270. Various filtering methods may include, for example, a deblocking filtering, a sample adaptive offset, an adaptive loop filter, a bilateral filter, and the like. The filter 260 may generate various kinds of filtering-related information to transfer the generated information to the entropy encoder 240, as described later in the description of each filtering method. The filtering-related information may be encoded by the entropy encoder 240 to be output in a form of the bitstream.

The modified reconstructed picture transmitted to the memory 270 may be used as the reference picture in the inter predictor 221. If the inter prediction is applied by the inter predictor, the encoding apparatus may avoid the prediction mismatch between the encoding apparatus 200 and the decoding apparatus, and also improve coding efficiency.

The DPB of the memory 270 may store the modified reconstructed picture to be used as the reference picture in the inter predictor 221. The memory 270 may store motion information of the block in which the motion information within the current picture is derived (or encoded) and/or motion information of the blocks within the previously reconstructed picture. The stored motion information may be transferred to the inter predictor 221 to be utilized as motion information of the spatial neighboring block or motion information of the temporal neighboring block. The memory 270 may store the reconstructed samples of the reconstructed blocks within the current picture, and transfer the reconstructed samples to the intra predictor 222.

Figure 3:
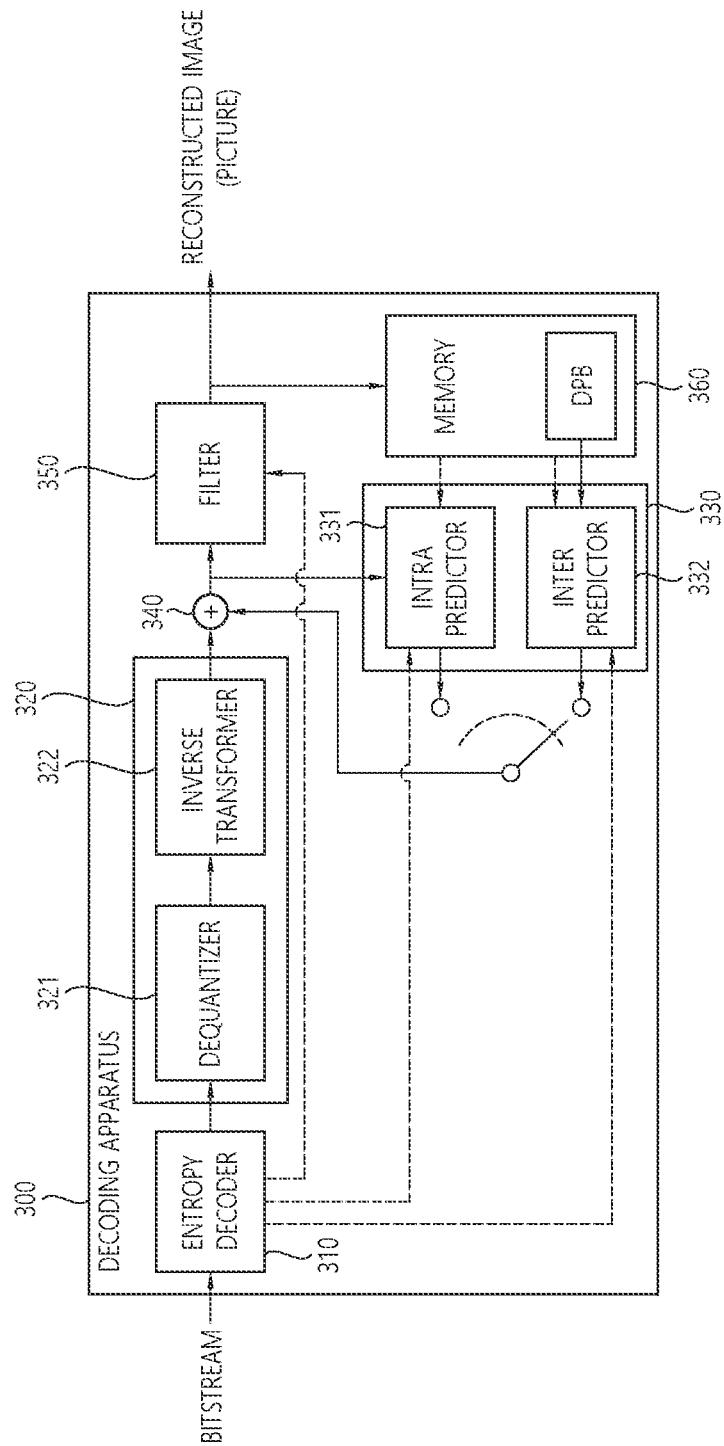
FIG. 3 is a schematic diagram illustrating a configuration of a video/image decoding apparatus to which the embodiment(s) of the present document may be applied.

FIG. 3 is a diagram for schematically explaining a configuration of a video/image decoding apparatus to which the embodiments of the present document may be applied. Hereinafter, what is referred to as the decoding apparatus may include an image decoding apparatus and/or a video decoding apparatus.

Referring to FIG. 3, the decoding apparatus 300 may include and configured with an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350, which have been described above, may be configured by one or more hardware components (e.g., decoder chipsets or processors) according to an embodiment. Further, the memory 360 may include a decoded picture buffer (DPB), and may be configured by a digital storage medium. The hardware component may further include the memory 360 as an internal/external component.

When the bitstream including the video/image information is input, the decoding apparatus 300 may reconstruct the image in response to a process in which the video/image information is processed in the encoding apparatus illustrated in FIG. 2. For example, the decoding apparatus 300 may derive the units/blocks based on block split-related information acquired from the bitstream. The decoding apparatus 300 may perform decoding using the processing unit applied to the encoding apparatus. Therefore, the processing unit for the decoding may be, for example, a coding unit, and the coding unit may be split according to the quad-tree structure, the binary-tree structure, and/or the ternary-tree structure from the coding tree unit or the maximum coding unit. One or more transform units may be derived from the coding unit. In addition, the reconstructed image signal decoded and output through the decoding apparatus 300 may be reproduced through a reproducing apparatus.

The decoding apparatus 300 may receive the signal output from the encoding apparatus illustrated in FIG. 2 in a form of the bitstream, and the received signal may be decoded through the entropy decoder 310. For example, the entropy decoder 310 may derive information (e.g., video/image information) necessary for the image reconstruction (or picture reconstruction) by parsing the bitstream. The video/image information may further include information about various parameter sets such as an adaptation parameter set (APS), a picture parameter set (PPS), a sequence parameter set (SPS), and a video parameter set (VPS). In addition, the video/image information may further include general constraint information. The decoding apparatus may decode the picture further based on the information about the parameter set and/or the general constraint information. The signaled/received information and/or syntax elements to be described later in the present document may be decoded through the decoding process and acquired from the bitstream. For example, the entropy decoder 310 may decode information within the bitstream based on a coding method such as an exponential Golomb coding, a CAVLC, or a CABAC, and output a value of the syntax element necessary for the image reconstruction, and the quantized values of the residual-related transform coefficient. More specifically, the CABAC entropy decoding method may receive a bin corresponding to each syntax element from the bitstream, determine a context model using syntax element information to be decoded and decoding information of the neighboring block and the block to be decoded or information of the symbol/bin decoded in the previous stage, and generate a symbol corresponding to a value of each syntax element by predicting the probability of generation of the bin according to the determined context model to perform the arithmetic decoding of the bin. At this time, the CABAC entropy decoding method may determine the context model and then update the context model using the information of the decoded symbol/bin for a context model of a next symbol/bin. The information about prediction among the information decoded by the entropy decoder 310 may be provided to the predictor (the inter predictor 332 and the intra predictor 331), and a residual value at which the entropy decoding is performed by the entropy decoder 310, that is, the quantized transform coefficients and the related parameter information may be input to the residual processor 320. The residual processor 320 may derive a residual signal (residual block, residual samples, and residual sample array). In addition, the information about filtering among the information decoded by the entropy decoder 310 may be provided to the filter 350. Meanwhile, a receiver (not illustrated) for receiving the signal output from the encoding apparatus may be further configured as the internal/external element of the decoding apparatus 300, or the receiver may also be a component of the entropy decoder 310. Meanwhile, the decoding apparatus according to the present document may be called a video/image/picture decoding apparatus, and the decoding apparatus may also be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients to output the transform coefficients. The dequantizer 321 may rearrange the quantized transform coefficients in a two-dimensional block form. In this case, the rearrangement may be performed based on a coefficient scan order performed by the encoding apparatus. The dequantizer 321 may perform dequantization for the quantized transform coefficients using a quantization parameter (e.g., quantization step size information), and acquire the transform coefficients.

The inverse transformer 322 inversely transforms the transform coefficients to acquire the residual signal (residual block, residual sample array).

The predictor 330 may perform the prediction of the current block, and generate a predicted block including the prediction samples of the current block. The predictor may determine whether the intra prediction is applied or the inter prediction is applied to the current block based on the information about prediction output from the entropy decoder 310, and determine a specific intra/inter prediction mode.

The predictor may generate the predicted signal based on various prediction methods to be described later. For example, the predictor may not only apply the intra prediction or the inter prediction for the prediction of one block, but also apply the intra prediction and the inter prediction at the same time. This may be called a combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present document. The palette mode may be regarded as an example of intra coding or intra prediction. When the palette mode is applied, information on a palette table and a palette index may be included in the video/image information and signaled.

The intra predictor 331 may predict the current block with reference to the samples within the current picture. The referenced samples may be located neighboring to the current block according to the prediction mode, or may also be located away from the current block. The prediction modes in the intra prediction may include a plurality of non-directional modes and a plurality of directional modes. The intra predictor 331 may also determine the prediction mode applied to the current block using the prediction mode applied to the neighboring block.

The inter predictor 332 may induce the predicted block of the current block based on the reference block (reference sample array) specified by the motion vector on the reference picture. At this time, in order to decrease the amount of the motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. For example, the inter predictor 332 may configure a motion information candidate list based on the neighboring blocks, and derive the motion vector and/or the reference picture index of the current block based on received candidate selection information. The inter prediction may be performed based on various prediction modes, and the information about the prediction may include information indicating the mode of the inter prediction of the current block.

The adder 340 may add the acquired residual signal to the predicted signal (predicted block, prediction sample array) output from the predictor (including the inter predictor 332 and/or the intra predictor 331) to generate the reconstructed signal (reconstructed picture, reconstructed block, reconstructed sample array). As in the case where the skip mode is applied, if there is no residual for the block to be processed, the predicted block may be used as the reconstructed block.

The adder 340 may be called a reconstructor or a reconstructed block generator. The generated reconstructed signal may be used for the intra prediction of a next block to be processed within the current picture, and as described later, may also be output through filtering or may also be used for the inter prediction of a next picture.

Meanwhile, a luma mapping with chroma scaling (LMCS) may also be applied in the picture decoding process.

The filter 350 may apply filtering to the reconstructed signal, thereby improving the subjective/objective image qualities. For example, the filter 350 may apply various filtering methods to the reconstructed picture to generate a modified reconstructed picture, and transmit the modified reconstructed picture to the memory 360, specifically, the DPB of the memory 360. Various filtering methods may include, for example, a deblocking filtering, a sample adaptive offset, an adaptive loop filter, a bidirectional filter, and the like.

The (modified) reconstructed picture stored in the DPB of the memory 360 may be used as the reference picture in the inter predictor 332. The memory 360 may store motion information of the block in which the motion information within the current picture is derived (decoded) and/or motion information of the blocks within the previously reconstructed picture. The stored motion information may be transferred to the inter predictor 260 to be utilized as motion information of the spatial neighboring block or motion information of the temporal neighboring block. The memory 360 may store the reconstructed samples of the reconstructed blocks within the current picture, and transfer the stored reconstructed samples to the intra predictor 331.

In the present document, the exemplary embodiments described in the filter 260, the inter predictor 221, and the intra predictor 222 of the encoding apparatus 200 may be applied equally to or to correspond to the filter 350, the inter predictor 332, and the intra predictor 331 of the decoding apparatus 300, respectively.

As described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization process. For example, the encoding apparatus may derive a residual block between the original block and the predicted block, perform a transform process on residual samples (residual sample array) included in the residual block to derive transform coefficients, perform a quantization process on the transform coefficients to derive quantized transform coefficients, and signal related residual information to the decoding apparatus (through a bit stream). Here, the residual information may include value information of the quantized transform coefficients, location information, a transform technique, a transform kernel, a quantization parameter, and the like. The decoding apparatus may perform dequantization/inverse transform process based on the residual information and derive residual samples (or residual blocks). The decoding apparatus may generate a reconstructed picture based on the predicted block and the residual block. Also, for reference for inter prediction of a picture afterward, the encoding apparatus may also dequantize/inverse-transform the quantized transform coefficients to derive a residual block and generate a reconstructed picture based thereon.

Meanwhile, as described above, the intra prediction or inter prediction may be applied when performing the prediction on the current block. In an embodiment, when the inter prediction is applied to the current block, the predictor (more specifically, the inter predictor) of the encoding/decoding apparatus may derive prediction samples by performing inter prediction in units of blocks. The inter prediction may represent prediction derived by a method dependent to the data elements (e.g., sample values or motion information) of a picture(s) other than the current picture. When the inter prediction is applied to the current block, a predicted block (prediction sample array) for the current block may be derived based on a reference block (reference sample array) specified by the motion vector on the reference picture indicated by the reference picture index. In this case, in order to reduce an amount of motion information transmitted in the inter-prediction mode, the motion information of the current block may be predicted in units of a block, a subblock, or a sample based on a correlation of the motion information between the neighboring block and the current block. The motion information may include the motion vector and the reference picture index. The motion information may further include inter-prediction type (L0 prediction, L1 prediction, Bi prediction, etc.) information. In the case of applying the inter prediction, the neighboring block may include a spatial neighboring block which is present in the current picture and a temporal neighboring block which is present in the reference picture. A reference picture including the reference block and a reference picture including the temporal neighboring block may be the same as each other or different from each other. The temporal neighboring block may be referred to as a name such as a collocated reference block, a collocated CU (colCU), etc., and the reference picture including the temporal neighboring block may be referred to as a collocated picture (colPic). For example, a motion information candidate list may be configured based on the neighboring blocks of the current block and a flag or index information indicating which candidate is selected (used) may be signaled in order to derive the motion vector and/or reference picture index of the current block. The inter prediction may be performed based on various prediction modes and for example, in the case of a skip mode and a merge mode, the motion information of the current block may be the same as the motion information of the selected neighboring block. In the case of the skip mode, the residual signal may not be transmitted unlike the merge mode. In the case of a motion vector prediction (MVP) mode, the motion vector of the selected neighboring block may be used as a motion vector predictor and a motion vector difference may be signaled. In this case, the motion vector of the current block may be derived by using a sum of the motion vector predictor and the motion vector difference.

The motion information may further include L0 motion information and/or L1 motion information according to the inter-prediction type (L0 prediction, L1 prediction, Bi prediction, etc.). A L0-direction motion vector may be referred to as an L0 motion vector or MVL0 and an L1-direction motion vector may be referred to as an L1 motion vector or MVL1. A prediction based on the L0 motion vector may be referred to as an L0 prediction, a prediction based on the L1 motion vector may be referred to as an L1 prediction, and a prediction based on both the L0 motion vector and the L1 motion vector may be referred to as a bi-prediction. Here, the L0 motion vector may indicate a motion vector associated with a reference picture list L0 and the L1 motion vector may indicate a motion vector associated with a reference picture list L1. The reference picture list L0 may include pictures prior to the current picture in an output order and the reference picture list L1 may include pictures subsequent to the current picture in the output order, as the reference pictures. The prior pictures may be referred to as a forward (reference) picture and the subsequent pictures may be referred to as a reverse (reference) picture. The reference picture list L0 may further include the pictures subsequent to the current picture in the output order as the reference pictures. In this case, the prior pictures may be first indexed in the reference picture list L0 and the subsequent pictures may then be indexed. The reference picture list L1 may further include the pictures prior to the current picture in the output order as the reference pictures. In this case, the subsequent pictures may be first indexed in the reference picture list L1 and the prior pictures may then be indexed. Here, the output order may correspond to a picture order count (POC) order.

Figure 4:
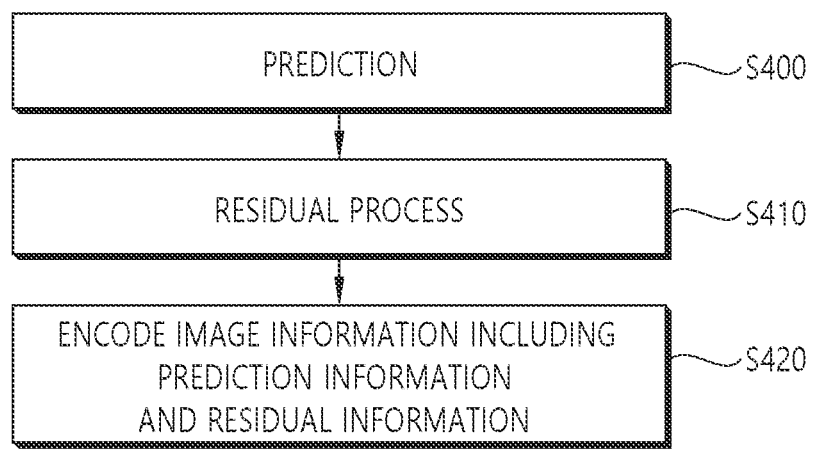
FIG. 4 represents an example of a schematic video/image encoding process to which an embodiment or embodiments of this document is/are applicable.

FIG. 4 represents an example of a schematic video/image encoding process to which an embodiment or embodiments of this document is/are applicable. In FIG. 4, S400 may be performed in the predictor 220 of the encoding apparatus described above in FIG. 2; S410 may be performed in the residual processor 230; and S420 may be performed in the entropy encoder 240. S400 may include the inter/intra prediction process described in the present document; S410 may include the residual processing process described in the present document; and S420 may include the information encoding process described in the present document.

Referring to FIG. 4, the video/image encoding process may schematically include a process of generating the reconstructed picture for the current picture and a process (optional) of applying the in-loop filtering to the reconstructed picture as well as a process of encoding information (e.g., prediction information, residual information, or partitioning information) for reconstructing the picture to output the encoded information in the form of the bitstream as described with reference to FIG. 2. The encoding apparatus may derive (modified) residual samples from the quantized transform coefficient by the dequantizer 234 and the inverse transformer 235, and generate the reconstructed picture based on the predicted samples which are the output in S400 and the (modified) residual samples. The thus generated reconstructed picture may be the same as the aforementioned reconstructed picture generated by the decoding apparatus. The modified reconstructed picture may be generated by the in-loop filtering process for the reconstructed picture, and may be stored in the decoding picture buffer or the memory 270, and as in the case of the decoding apparatus, used as the reference picture in the inter prediction process upon encoding the picture later. As described above, in some cases, some or all of the in-loop filtering process may be omitted. If the in-loop filtering process is performed, the (in-loop) filtering-related information (parameter) is encoded by the entropy encoder 240 and outputted in the form of the bitstream, and the decoding apparatus may perform the in-loop filtering process in the same method as that of the encoding apparatus based on the filtering-related information.

It is possible to reduce noises generated upon coding the image/the video, such as blocking artifact and ringing artifact by the in-loop filtering process, and to enhance subjective/objective visual qualities. Further, by performing the in-loop filtering process both in the encoding apparatus and the decoding apparatus, the encoding apparatus and the decoding apparatus may derive the same prediction results, increase reliability of the picture coding, and reduce an amount of data to be transmitted for coding the picture.

As described above, the picture reconstruction process may be performed in the encoding apparatus as well as in the decoding apparatus. The reconstructed block may be generated based on the intra prediction/the inter prediction in units of each block, and the reconstructed picture including the reconstructed blocks may be generated. If a current picture/slice/tile group is an I picture/slice/tile group, blocks included in the current picture/slice/tile group may be reconstructed based on only the intra prediction. Meanwhile, if the current picture/slice/tile group is a P or B picture/slice/tile group, blocks included in the current picture/slice/tile group may be reconstructed based on the intra prediction or the inter prediction. In this case, the inter prediction may be applied to some blocks in the current picture/slice/tile group, and the intra prediction may also be applied to other blocks. A color component of the picture may include a luma component and a chroma component, and the methods and exemplary embodiments proposed in the present document may be applied to the luma component and the chroma component unless explicitly limited in the present document.

Figure 5:
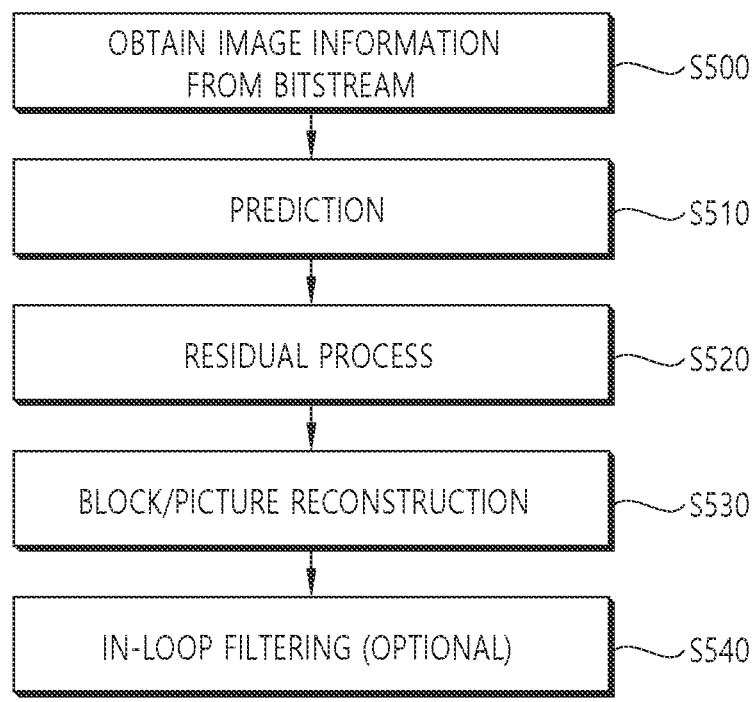
FIG. 5 represents an example of a schematic video/image decoding process to which an embodiment or embodiments of this document is/are applicable.

FIG. 5 represents an example of a schematic video/image decoding process to which an embodiment or embodiments of this document is/are applicable. In FIG. 5, S500 may be performed in the entropy decoder 310 of the decoding apparatus described above in FIG. 3; S510 may be performed in the predictor 330; S520 may be performed in the residual processor 320; S530 may be performed in the adder 340; and S540 may be performed in the filter 350. S500 may include the information decoding process described in the present document; S510 may include the inter/intra prediction process described in the present document; S520 may include the residual processing process described in the present document; S530 may include the block/picture reconstruction process described in the present document; and S540 may include the in-loop filtering process described in the present document.

Referring to FIG. 5, as represented in the description with regard to FIG. 3, the picture decoding process may schematically include an image/video information obtaining process S500 from a bitstream (through decoding), a picture reconstruction process S510 to S530, and an in-loop filtering process S540 for the reconstructed picture. The picture reconstruction process may be performed based on the residual samples and the prediction samples obtained through the inter/intra prediction S510 and the residual processing S520 (dequantization for the quantized transform coefficient, inverse transform) process described in the present document. Through the in-loop filtering process for the reconstructed picture which has been generated though the picture reconstruction process, a modified reconstructed picture may be generated, which may be output as a decoded picture, and may also be stored in the decoding picture buffer or a memory 360 of the decoding apparatus and be used as a reference picture in the inter prediction process of the later picture decoding.

According to circumstances, the in-loop filtering process may be skipped, and in this case, the reconstructed picture may be output as a decoded picture, and may also be stored in the decoding picture buffer or a memory 360 of the decoding apparatus and be used as a reference picture in the inter prediction process of the later picture decoding. The in-loop filtering process S540 may include the deblocking filtering process, the sample adaptive offset (SAO) process, the adaptive loop filter (ALF) process, and/or the bi-lateral filter process as described above, and all or some of them may be skipped. Further, one or some of the deblocking filtering process, the sample adaptive offset (SAO) process, the adaptive loop filter (ALF) process, and the bi-lateral filter processes may be sequentially applied, or all of them may be sequentially applied. For example, after the deblocking filtering process is applied to the reconstructed picture, the SAO process may be performed thereon. Alternatively, for example, after the deblocking filtering process is applied to the reconstructed picture, the ALF process may be performed thereon. This may be likewise performed in the encoding apparatus.

Meanwhile, as described above, the encoding apparatus performs entropy encoding based on various encoding methods such as, for example, exponential Golomb, context-adaptive variable length coding (CAVLC), context-adaptive binary arithmetic coding (CABAC) and the like. Also, the decoding apparatus may perform entropy decoding based on a coding method such as exponential Golomb coding, CAVLC, or CABAC. Hereinafter, an entropy encoding/decoding process will be described.

Figure 6:
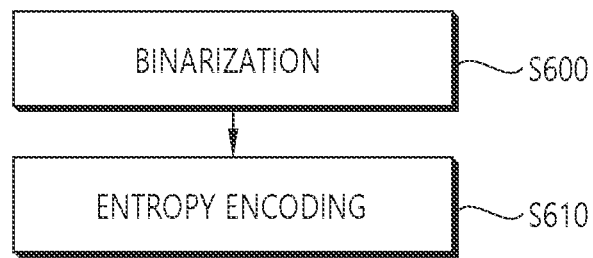
FIG. 6 schematically illustrates an example of an entropy encoding method to which embodiments of this document are applicable, and FIG. 7 schematically illustrates an entropy encoder in an encoding apparatus.
Figure 7:
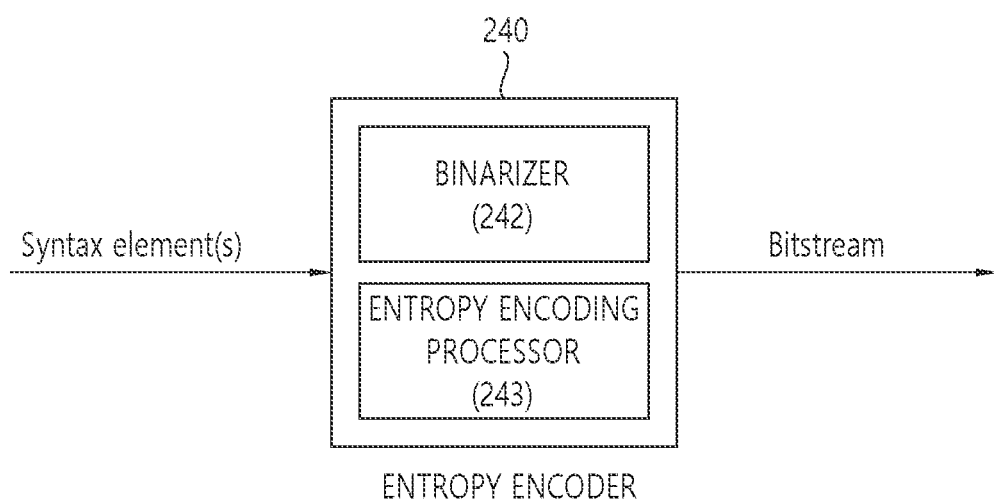

FIG. 6 schematically illustrates an example of an entropy encoding method to which embodiments of this document are applicable, and FIG. 7 schematically illustrates an entropy encoder in an encoding apparatus. The entropy encoder in the encoding apparatus of FIG. 7 may also be equally or correspondingly applied to the above-described entropy encoder 240 of the encoding apparatus 200 of FIG. 2.

Referring to FIGS. 6 and 7, the encoding apparatus (entropy encoder) performs an entropy coding process on image/video information. The image/video information may include partitioning-related information, prediction-related information (e.g., inter/intra prediction distinguishing information, intra prediction mode information, inter prediction mode information, or the like), residual information, in-loop filtering-related information, or may include various syntax elements related to them. The entropy coding may be performed in syntax element units. S600 and S610 may be performed by the above-described entropy encoder 240 of the encoding apparatus 200 of FIG. 2.

The encoding apparatus may perform binarization on a target syntax element (S600). Here, the binarization may be based on various binarization methods such as Truncated Rice binarization process, Fixed-length binarization process, and the like, and the binarization method for the target syntax element may be predefined. The binarization process may be performed by a binarizer 242 in the entropy encoder 240.

The encoding apparatus may perform entropy encoding on the target syntax element (S610). The encoding apparatus may regular coding-based (context-based) or bypass coding-based encode a bin string of the target syntax element based on a entropy coding scheme such as context-adaptive arithmetic coding (CABAC) or context-adaptive variable length coding (CAVLC), and the output thereof may be incorporated into the bitstream. The entropy encoding process may be performed by an entropy encoding processor 243 in the entropy encoder 240. As described above, the bitstream may be transferred to the decoding apparatus through a (digital) storage medium or a network.

Figure 8:
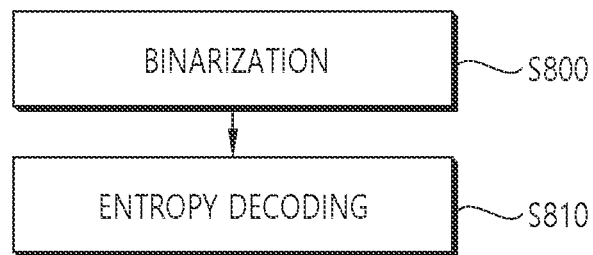
FIG. 8 schematically illustrates an example of an entropy decoding method to which embodiments of the present document are applicable, and FIG. 9 schematically illustrates an entropy decoder in a decoding apparatus.
Figure 9:
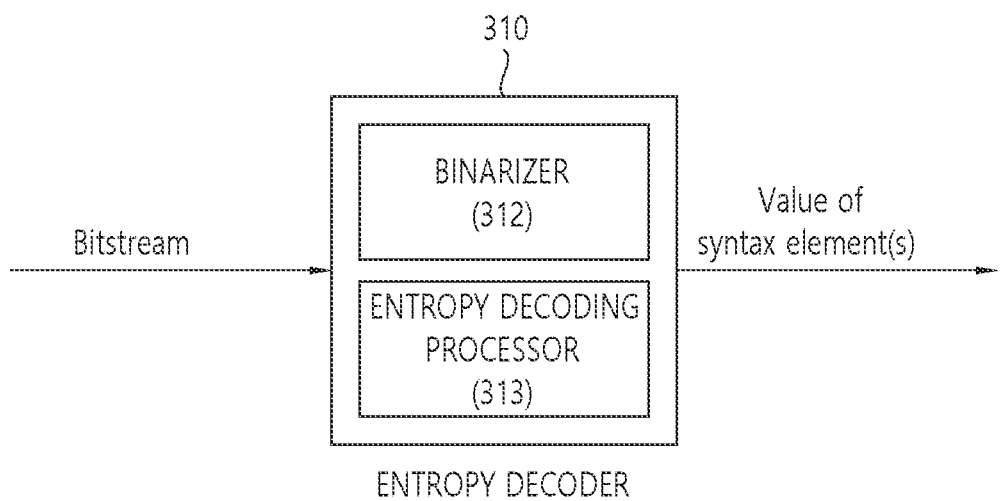

FIG. 8 schematically illustrates an example of an entropy decoding method to which embodiments of the present document are applicable, and FIG. 9 schematically illustrates an entropy decoder in a decoding apparatus. The entropy decoder in the decoding apparatus of FIG. 9 may also be equally or correspondingly applied to the above-described entropy decoder 310 of the decoding apparatus 300 of FIG. 3.

Referring to FIGS. 8 and 9, a decoding apparatus (entropy decoder) may decode encoded image/video information. The image/video information may include partitioning-related information, prediction-related information (e.g., inter/intra prediction distinguishing information, intra prediction mode information, inter prediction mode information, or the like), residual information, in-loop filtering-related information, or may include various syntax elements related to them. The entropy coding may be performed in syntax element units. S800 and S810 may be performed by the above-described entropy decoder 310 of the decoding apparatus 300 of FIG. 3.

The decoding apparatus may perform binarization on a target syntax element (S800). Here, the binarization may be based on various binarization methods such as Truncated Rice binarization process, Fixed-length binarization process, and the like, and the binarization method for the target syntax element may be predefined. The decoding apparatus may derive enabled bin strings (bin string candidates) for enabled values of the target syntax element through the binarization process. The binarization process may be performed by a binarizer 312 in the entropy decoder 310.

The decoding apparatus may perform entropy decoding on the target syntax element (S810). While decoding and parsing sequentially each bin for the target syntax element from the input bit(s) in the bitstream, the decoding apparatus compares the derived bin string with enabled bin strings for the corresponding syntax element. When the derived bin string is the same as one of the enabled bin strings, the value corresponding to the bin string may be derived as a value of the syntax element. If not, the above-described process may be performed again after further parsing the next bit in the bitstream. Through these processes, even without using a start bit or an end bit for specific information (specific syntax element) in a bitstream, the decoding apparatus may signal the information using a variable length bit. Through this, relatively less bits may be assigned to a low value, thereby increasing an overall coding efficiency.

The decoding apparatus may perform context-based or bypass-based decoding on respective bins in the bin string from a bitstream based on an entropy coding technique such as CABAC, CAVLC or the like. In this connection, the bitstream may include various information for image/video decoding as described above. As described above, the bitstream may be transferred to the decoding apparatus through a (digital) storage medium or a network.

Figure 10:
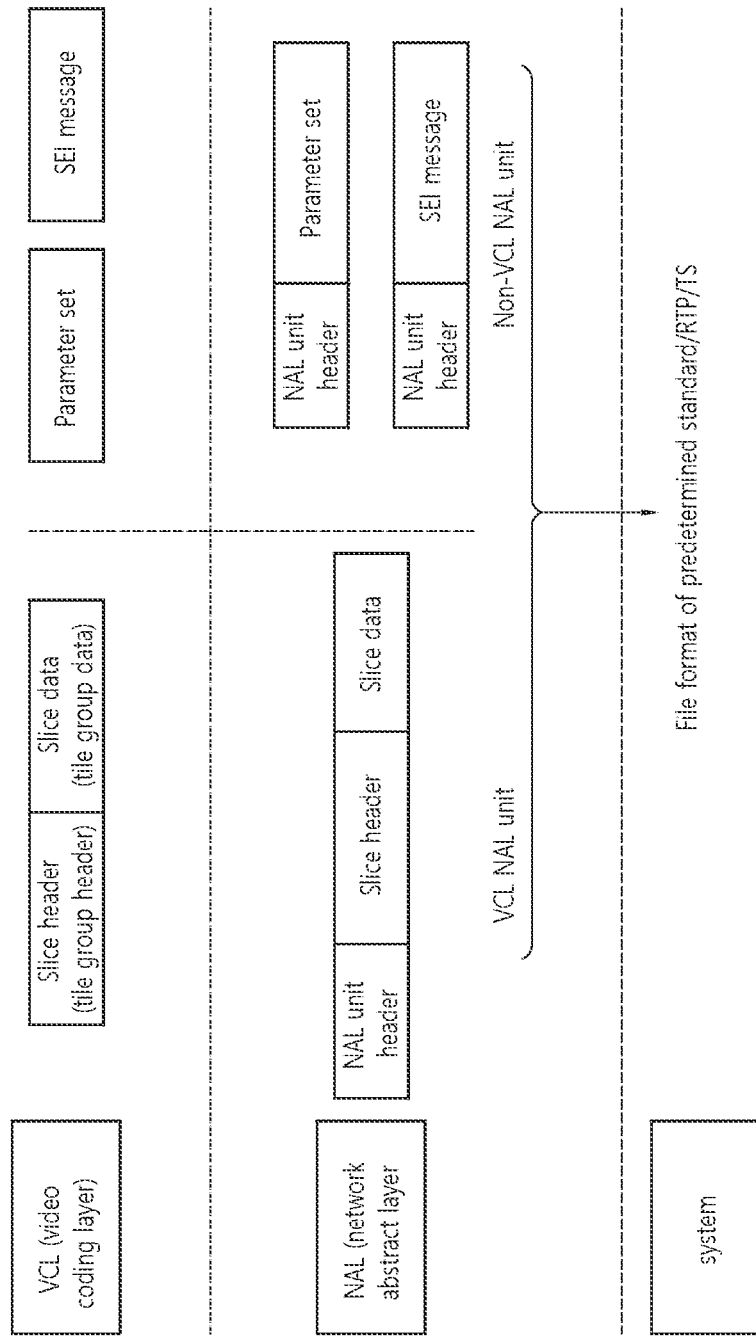
FIG. 10 exemplarily represents a hierarchical structure for a coded image/video.

FIG. 10 exemplarily shows a hierarchical structure for a coded image/video.

Referring to FIG. 10, the coded image/video is divided into VCL (video coding layer) that deals with an image/video decoding process and itself, a subsystem that transmits and stores the coded information, and a network abstraction layer (NAL) that exists between the VCL and subsystems and is responsible for network adaptation functions.

The VCL may generate VCL data including compressed image data (slice data), or generate parameter sets including a picture parameter set (Picture Parameter Set: PPS), a sequence parameter set (Sequence Parameter Set: SPS), a video parameter set (Video Parameter Set: VPS) etc. or a supplemental enhancement information (SEI) message additionally necessary for the decoding process of an image.

In the NAL, a NAL unit may be generated by adding header information (NAL unit header) to a raw byte sequence payload (RBSP) generated in the VCL. In this case, the RBSP refers to slice data, parameter sets, SEI messages, etc. generated in the VCL. The NAL unit header may include NAL unit type information specified according to RBSP data included in the corresponding NAL unit.

Additionally, the NAL unit may be divided into a VCL NAL unit and a Non-VCL NAL unit according to the RBSP generated in the VCL. The VCL NAL unit may refer to a NAL unit including information on an image (slice data), and the Non-VCL NAL unit may refer to a NAL unit including information (parameter set or SEI message) required to decode an image.

The VCL NAL unit and Non-VCL NAL unit may be transmitted through a network by attaching header information according to a data standard of the subsystem. For example, the NAL unit may be transformed into a data form of a predetermined standard, such as an H.266/VVC file format, a Real-time Transport Protocol (RTP), and a Transport Stream (TS), etc., and transmitted through various networks.

As described above, in the NAL unit, the NAL unit type may be specified according to the RBSP data structure included in the corresponding NAL unit, and information on this NAL unit type may be stored and signaled in the NAL unit header.

For example, the NAL unit may be roughly classified into the VCL NAL unit type and the Non-VCL NAL unit type depending on whether the NAL unit includes information about the image (slice data). The VCL NAL unit type may be classified according to property and a type of a picture included in the VCL NAL unit, and the Non-VCL NAL unit type may be classified according to the type of a parameter set.

The following is an example of the NAL unit type specified according to the type of parameter set included in the Non-VCL NAL unit type.

APS (Adaptation Parameter Set) NAL unit: Type for NAL unit including APS

DPS (Decoding Parameter Set) NAL unit: Type for NAL unit including DPS

VPS (Video Parameter Set) NAL unit: Type for NAL unit including VPS

SPS (Sequence Parameter Set) NAL unit: Type for NAL unit including SPS

PPS (Picture Parameter Set) NAL unit: Type for NAL unit including PPS

PH (Picture header) NAL unit: Type for NAL unit including PH

The above-described NAL unit types have syntax information for the NAL unit type, and the syntax information may be stored and signaled in the NAL unit header. For example, the syntax information may be nal_unit_type, and NAL unit types may be specified by a nal_unit_type value.

Meanwhile, as described above, one picture may include a plurality of slices, and one slice may include a slice header and slice data. In this case, one picture header may be further added to a plurality of slices (a slice header and a slice data set) in one picture. The picture header (picture header syntax) may include information/parameters commonly applicable to the picture. In this document, a tile group may be mixed or replaced with a slice or a picture. Also, in this document, a tile group header may be mixed or replaced with a slice header or a picture header.

The slice header (slice header syntax) may include information/parameters commonly applicable to the slice. The APS (APS syntax) or PPS (PPS syntax) may include information/parameters commonly applicable to one or more slices or pictures. The SPS (SPS syntax) may include information/parameters commonly applicable to one or more sequences. The VPS (VPS syntax) may include information/parameters commonly applicable to multiple layers. The DPS (DPS syntax) may include information/parameters commonly applicable to the entire video. The DPS may include information/parameters related to concatenation of a coded video sequence (CVS). In this document, high level syntax (HLS) may include at least one of the APS syntax, PPS syntax, SPS syntax, VPS syntax, DPS syntax, picture header syntax, and slice header syntax.

In this document, the image/video information encoded in the encoding apparatus and signaled in the form of a bitstream to the decoding apparatus may include, as well as picture partitioning-related information in the picture, intra/inter prediction information, residual information, in-loop filtering information, etc. the information included in the slice header, the information included in the picture header, the information included in the APS, the information included in the PPS, the information included in the SPS, the information included in the VPS, and/or the information included in the DPS. In addition, the image/video information may further include information of the NAL unit header.

As described above, the high level syntax (HLS) may be coded/signaled for video/image coding. In the present document, video/image information may include the HLS. For example, a picture being coded may be constructed with one or more slices. Parameters describing the picture being coded may be signaled in a picture header (PH), and parameters describing a slice may be signaled in a slice header (SH). The PH may be transmitted in its own NAL unit type. The SH may be present at the start portion of a NAL unit including a payload of a slice (i.e., slice data). Details of the syntax and semantics of the PH and the SH may be as disclosed in the VVC standard. Each picture may be associated with a PH. A picture may be constructed with different types of slices: intra-coded slices (i.e., I slices) and inter-coded slices (i.e., P-slice and B-slice). As a result, the PH may include syntax elements necessary for an intra slice of a picture and an inter slice of a picture.

Meanwhile, in general, one NAL unit type may be set for one picture. The NAL unit type may be signaled through nal_unit_type in a NAL unit header of a NAL unit including a slice. nal_unit_type is syntax information for specifying the NAL unit type, that is, as shown in Table 1 or Table 2 below, may specify the type of the RBSP data structure included in the NAL unit.

Table 1 below shows an example of a NAL unit type code and a NAL unit type class.

TABLE 1

| nal_unit_type | Name of nal_unit_type | Content of NAL unit and RBSP syntax structure | NAL unit type class |
|---|---|---|---|
| 0 | TRAIL_NUT | Coded slice of a trailing picture slice_layer_rbsp( ) | VCL |
| 1 | STSA_NUT | Coded slice of an STSA picture slice_layer_rbsp( ) | VCL |
| 2 | RADL_NUT | Coded slice of a RADL picture slice_layer_rbsp( ) | VCL |
| 3 | RASL_NUT | Coded slice of a RASL picture slice_layer_rbsp( ) | VCL |
| 4 . . . 6 | RSV_VCL_4 . . . RSV_VCL_6 | Reserved non-IRAP VCL NAL unit types | VCL |
| 7 | IDR_W_RADL | Coded slice of an IDR picture | VCL |
| 8 | IDR_N_LP | slice_layer_rbsp( ) | |
| 9 | CRA_NUT | Coded slice of a CRA picture silce_layer_rbsp( ) | VCL |
| 10 | GDR_NUT | Coded slice of a GDR picture slice_layer_rbsp( ) | VCL |
| 11 | RSV_IRAP_11 | Reserved IRAP VCL NAL unit types | VCL |
| 12 | RSV_IRAP_12 | | |
| 13 | DPS_NUT | Decoding parameter set decoding_parameter_set_rbsp( ) | non-VCL |
| 14 | VPS_NUT | Video parameter set video_parameter_set_rbsp( ) | non-VCL |
| 15 | SPS_NUT | Sequence parameter set seq_parameter_set_rbsp( ) | non-VCL |
| 16 | PPS_NUT | Picture parameter set pic_parameter_set_rbsp( ) | non-VCL |
| 17 | PREFIX_APS_NUT | Adaptation parameter set | non-VCL |
| 18 | SUFFIX_APS_NUT | adaptation_parameter_set_rbsp( ) | |
| 19 | PH_NUT | Picture header picture_header_rbsp( ) | non-VCL |
| 20 | AUD_NUT | AU delimiter access_unit_delimiter_rbsp( ) | non-VCL |
| 21 | EOS_NUT | End of sequence end_of_seq_rbsp( ) | non-VCL |
| 22 | EOB_NUT | End of bitstream end_of_bitstream_rbsp( ) | non-VCL |
| 23 | PREFIX_SEI_NUT | Supplemental enhancement information | non-VCL |
| 24 | SUFFIX_SEI_NUT | sci_rbsp( ) | |
| 25 | FD_NUT | Filler data filler_data_rbsp( ) | non-VCL |

TABLE 1-continued

| nal_unit_type | Name of nal_unit_type | Content of NAL unit and RBSP syntax structure | NAL unit type class |
|---|---|---|---|
| 26 | RSV_NVCL_26 | Reserved non-VCL NAL unit types | non-VCL |
| 27 | RSV_NVCL_27 | | |
| 28 . . . 31 | UNSPEC_28 . . . UNSPEC_31 | Unspecified non-VCL NAL unit types | non-VCL |

Alternatively, as an example, a NAL unit type code and a NAL unit type class may be defined as shown in Table 2 below.

TABLE 2

| nal_unit_type | Name of nal_unit_type | Content of NAL unit and RBSP syntax structure | NAL unit type class |
|---|---|---|---|
| 0 | TRAIL_NUT | Coded slice of a trailing picture or subpicture* slice_layer_rbsp( ) | VCL |
| 1 | STSA_NUT | Coded slice of an STSA picture or subpicture* slice_layer_rbsp( ) | VCL |
| 2 | RADL_NUT | Coded slice of a RADL picture or subpicture* slice_layer_rbsp( ) | VCL |
| 3 | RASL_NUT | Coded slice of a RASL picture or subpicture* slice_layer_rbsp( ) | VCL |
| 4 . . . 6 | RSV_VCL_4 . . . RSV_VCL_6 | Reserved non-IRAP VCL NAL unit types | VCL |
| 7 | IDR_W_RADL | Coded slice of an IDR picture or subpicture* slice_layer_rbsp( ) | VCL |
| 8 | IDR_N_LP | | |
| 9 | CRA_NUT | Coded slice of a CRA picture or subpicture* slice_layer_rbsp( ) | VCL |
| 10 | GDR_NUT | Coded slice of a GDR picture or subpicture* slice_layer_rbsp( ) | VCL |
| 11 | RSV_IRAP_11 | Reserved IRAP VCL NAL unit type | VCL |
| 12 | OPI_NUT | Operating point information operating_point_information_rbsp( ) | non-VCL |
| 13 | DCI_NUT | Decoding capability information decoding_capability_information_rbsp( ) | non-VCL |
| 14 | VPS_NUT | Video parameter set video_parameter_set_rbsp( ) | non-VCL |
| 15 | SPS_NUT | Sequence parameter set seq_parameter_set_rbsp( ) | non-VCL |
| 16 | PPS_NUT | Picture parameter set pic_parameter_set_rbsp( ) | non-VCL |
| 17 | PREFIX_APS_NUT | Adaptation parameter set adaptation_parameter_set_rbsp( ) | non-VCL |
| 18 | SUFFIX_APS_NUT | | |
| 19 | PH_NUT | Picture header picture_header_rbsp( ) | non-VCL |
| 20 | AUD_NUT | AU delimiter access_unit_delimiter_rbsp( ) | non-VCL |
| 21 | EOS_NUT | End of sequence end_of_seq_rbsp( ) | non-VCL |
| 22 | EOB_NUT | End of bitstream end_of_bitstream_rbsp( ) | non-VCL |
| 23 | PREFIX_SEI_NUT | Supplemental enhancement information sei_rbsp( ) | non-VCL |
| 24 | SUFFIX_SEI_NUT | | |
| 25 | FD_NUT | Filler data filler_data_rbsp( ) | non-VCL |
| 26 | RSV_NVCL_26 | Reserved non-VCL NAL unit types | non-VCL |
| 27 | RSV_NVCL_27 | | |
| 28 . . . 31 | UNSPEC_28 . . . UNSPEC_31 | Unspecified non-VCL NAL unit types | non-VCL |

*indicates a property of a picture when pps_mixed_nalu_types_in_pic_flag is equal to 0 and a property of the subpicture when pps_mixed_nalu_types_in_pic_flag is equal to 1.

As shown in Table 1 or Table 2, the name of the NAL unit type and its value may be specified according to the RBSP data structure included in the NAL unit, and may be classified into a VCL NAL unit type and a Non-VCL NAL unit type according to whether the NAL unit includes information on image (slice data). The VCL NAL unit type may be classified depending on properties, kinds and the like of pictures, and the Non-VCL NAL unit type may be classified depending on kinds and the like of parameter sets. For example, NAL unit types may be specified according to the properties and kinds of pictures included in the VCL NAL unit as follows.

TRAIL: It indicates a type for a NAL unit including coded slice data of a trailing picture/subpicture. For example, nal_unit_type may be defined as TRAIL_NUT, and the value of nal_unit_type may be specified as 0.

Here, the trailing picture refers to a picture that follows a picture that can be accessed randomly in output order and decoding order. A trailing picture may be a non-IRAP picture that follows the associated IRAP picture in output order and is not an STSA picture. For example, trailing pictures associated with an IRAP picture follow the IRAP picture in decoding order. Pictures that follow the associated IRAP picture in output order and precede the associated TRAP picture in decoding order are not allowed.

STSA (Step-wise Temporal Sub-layer Access): It indicates a type for a NAL unit including coded slice data of an STSA picture/subpicture. For example, nal_unit_type may be defined as STSA_NUT, and the value of nal_unit_type may be specified as 1.

Here, the STSA picture is a picture that can be switched between temporal sublayers in a bitstream supporting temporal scalability, and is a picture indicating a position where up-switching is possible from a lower sub-layer to an upper sub-layer one step higher than the lower sub-layer. The STSA picture does not use TemporalId same as STSA picture and the picture in the same layer as the STSA picture for inter prediction reference. Pictures following the STSA picture in the same layer and the same TemporalId as the STSA picture in decoding order do not use the picture before the STSA picture in the same layer and the same TemporalId as the STSA picture in decoding order for inter prediction reference. The STSA picture enables in the STSA picture the up-switching from the immediately lower sublayer to the sublayer including the STSA picture. In this case, the picture being coded must not belong to the lowest sublayer. That is, STSA pictures must always have a TemporalId greater than 0.

RADL (random access decodable leading (picture)): It indicates a type for a NAL unit including slice data being coded of a RADL picture/subpicture. For example, nal_unit_ type may be defined as RADL_NUT, and the value of nal_unit_type may be specified as 2.

Here, all RADL pictures are leading pictures. The RADL picture is not used as a reference picture for the decoding process of trailing pictures of the same associated IRAP picture. Specifically, a RADL picture having a nuh_layer_id equal to layerId is a picture that follows an IRAP picture associated with a RADL picture in output order, and is not used as a reference picture for the decoding process of a picture having a nuh_layer_id equal to layerId. When field_seq_flag (i.e., sps_field_seq_flag) is 0, all RADL pictures precede all non-leading pictures of the same associated IRAP picture in decoding order (i.e., if a RADL picture is present). Meanwhile, the leading picture refers to a picture preceding the related IRAP picture in output order.

RASL (random access skipped leading (picture)): It indicates a type for a NAL unit including slice data being coded of a RASL picture/subpicture. For example, nal_unit_type may be defined as RASL_NUT, and the value of nal_unit_ type may be specified as 3.

Here, all RASL pictures are leading pictures of the associated CRA picture. When the associated CRA picture has NoOutputBeforeRecoveryFlag whose value is 1, the RASL picture may neither be output nor correctly decoded since the RASL picture may include references to pictures that is not present in the bitstream. A RASL picture is not used as a reference picture for the decoding process of a non-RASL picture of the same layer. However, the RADL subpicture in the RASL picture of the same layer may be used for inter prediction for the collocated RADL subpicture in the RADL picture associated with the same CRA picture as the RASL picture. When field_seq_flag (i.e., sps_field_seq_flag) is 0, all RASL pictures precede all non-leading pictures of the same associated CRA picture in decoding order (i.e., if the RASL picture is present).

There may be a reserved nal_unit_type for the non-IRAP VCL NAL unit type. For example, nal_unit_type may be defined as RSV_VCL_4 to RSV_VCL_6, and values of nal_unit_type may be specified as 4 to 6, respectively.

Here, an intra random access point (IRAP) is information indicating a NAL unit for a picture capable of random access. The IRAP picture may be a CRA picture or an IDR picture. For example, the IRAP picture refers to a picture having a NAL unit type in which nal_unit_type is defined as IDR_W_RADL, IDR_N_LP, and CRA_NUT, as in Table 1 or Table 2 above, and the values of nal_unit_type may be specified as 7 to 9, respectively.

IRAP pictures do not use any reference picture in the same layer for inter prediction in the decoding process. In other words, the IRAP picture does not reference any picture other than itself for inter prediction in the decoding process. The first picture in the bitstream in decoding order becomes an IRAP or GDR picture. For a single-layer bitstream, if the necessary parameter set is available when there is a need to reference it, all following non-RASL pictures and IRAP pictures of a coded layer video sequence (CLVS) in decoding order can be accurately decoded without performing the decoding process of pictures preceding the TRAP picture in decoding order.

The value of mixed_nalu_types_in_pic_flag for an IRAP picture is 0. When the value of mixed_nalu_types_in_pic_flag for the picture is 0, one slice in the picture may have a NAL unit type (nal_unit_type) within the range from IDR_W_RADL to CRA_NUT (e.g., the value of the NAL unit type in Table 1 or Table 2 is 7 to 9), and all other slices in the picture may have the same NAL unit type (nal_unit_type). In this case, the picture may be regarded as an IRAP picture.

Instantaneous decoding refresh (IDR): It indicates a type for a NAL unit including slice data being coded of an IDR picture/subpicture. For example, nal_unit_type for an IDR picture/subpicture may be defined as IDR_W_RADL or IDR_N_LP, and values of nal_unit_type may be specified as 7 or 8, respectively.

Here, the IDR picture may not use inter prediction in the decoding process (that is, it does not reference pictures other than itself for inter prediction), but may become the first picture in decoding order in the bitstream, or may appear later (i.e., not first, but later) in the bitstream. Each IDR picture is the first picture of a coded video sequence (CVS) in decoding order. For example, when the IDR picture has an association with the decodable leading picture, the NAL unit type of the IDR picture may be represented as IDR_W_RADL, while, when the IDR picture has no association with the leading picture, the NAL unit type of the IDR picture may be represented as IDR_N_LP. That is, an IDR picture whose NAL unit type is IDR_W_RADL may not have an associated RASL picture existing in the bitstream, but may have an associated RADL picture in the bitstream. An IDR picture whose NAL unit type is IDR_N_LP does not have an associated leading picture present in the bitstream.

Clean random access (CRA): It indicates a type for a NAL unit including slice data being coded of a CRA picture/subpicture. For example, nal_unit_type may be defined as CRA_NUT, and the value of nal_unit_type may be specified as 9.

Here, the CRA picture may not use inter prediction in the decoding process (that is, it does not reference pictures other than itself for inter prediction), but may become the first picture in decoding order in the bitstream, or may appear later (i.e., not first, but later) in the bitstream. The CRA picture may have an associated RADL or RASL picture present in the bitstream. For a CRA picture in which the value of NoOutputBeforeRecoveryFlag is 1, the associated RASL pictures may not be output by the decoder. This is because it is not possible to decode in this case due to the inclusion of reference to a picture that is not present in the bitstream.

Gradual decoding refresh (GDR): It indicates a type for a NAL unit including slice data being coded of a GDR picture/subpicture. For example, nal_unit_type may be defined as GDR_NUT, and the value of nal_unit_type may be specified as 10.

Here, the value of pps_mixed_nalu_types_in_pic_flag for the GDR picture may be 0. When the value of pps_mixed_nalu_types_in_pic_flag is 0 for the picture and one slice in the picture has a NAL unit type of GDR_NUT, all other slices in the picture have the same value of the NAL unit type (nal_unit_type), and in this case, the picture may become a GDR picture after receiving the first slice.

Also, for example, NAL unit types may be specified according to the kinds of parameters included in the Non-VCL NAL unit, and, as shown in Table 1 or Table 2 above, NAL unit types (nal_unit_type) such as VPS_NUT indicating a type for a NAL unit including a video parameter set, SPS_NUT indicating a type for a NAL unit including a sequence parameter set, PPS_NUT indicating the type for the NAL unit including the picture parameter set, and PH_NUT indicating the type for the NAL unit including the picture header may be included.

Meanwhile, a bitstream (or temporal scalable bitstream) supporting temporal scalability includes information on a temporally scaled temporal layer. The information on the temporal layer may be identification information of the temporal layer specified according to the temporal scalability of the NAL unit. For example, identification information of the temporal layer may use temporal_id syntax information, and the temporal_id syntax information may be stored in a NAL unit header in an encoding apparatus, and signaled to a decoding apparatus. Hereinafter, in the present specification, the temporal layer may be referred to as a sub-layer, a temporal sub-layer, a temporal scalable layer, or the like.

Figure 11:
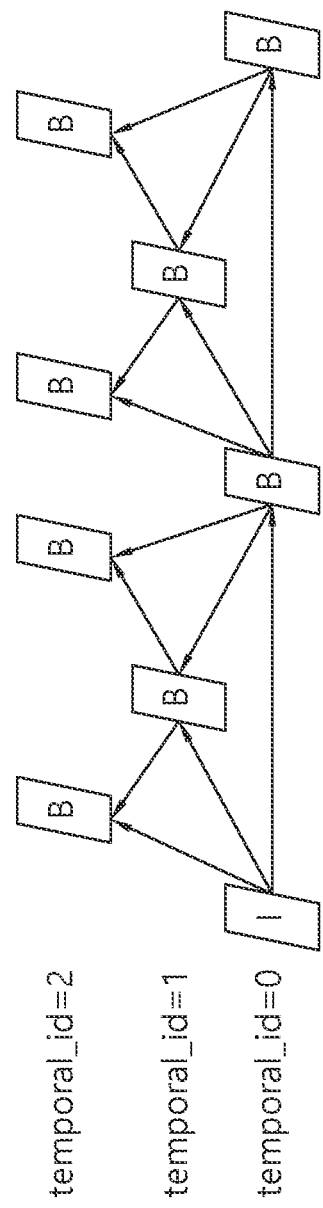
FIG. 11 is a diagram showing a temporal layer structure for NAL units in a bitstream supporting temporal scalability.

FIG. 11 is a diagram showing a temporal layer structure for NAL units in a bitstream supporting temporal scalability.

When the bitstream supports temporal scalability, NAL units included in the bitstream have identification information (e.g., temporal_id) of the temporal layer. As an example, the temporal layer constructed with NAL units whose temporal_id value is 0 may provide the lowest temporal scalability, and a temporal layer constructed with NAL units whose temporal_id value is 2 may provide the highest temporal scalability.

In FIG. 11, a box marked with I refers to an I picture, and a box marked with B refers to a B picture. In addition, an arrow indicates a reference relationship with respect to whether a picture references another picture.

As shown in FIG. 11, NAL units of a temporal layer whose temporal_id value is 0 are reference pictures that can be referenced by NAL units of a temporal layer whose temporal_id value is 0, 1, or 2. NAL units of a temporal layer whose temporal_id value is 1 are reference pictures that can be referenced by NAL units of a temporal layer whose temporal_id value is 1 or 2. NAL units of a temporal layer whose temporal_id value is 2 may be reference pictures that NAL units of the same temporal layer, that is, a temporal layer whose temporal_id value is 2, can reference, or may be non-reference pictures that are not referenced by other pictures.

If, as shown in FIG. 11, NAL units of a temporal layer whose temporal_id value is 2, that is, the highest temporal layer, are non-reference pictures, these NAL units are extracted (or removed) from the bitstream without affecting other pictures in the decoding process.

Meanwhile, among the above-described NAL unit types, IDR and CRA types are information indicating a NAL unit including a picture capable of random access (or splicing), that is, a random access point (RAP) or intra random access point (IRAP) picture serving as a random access point. In other words, the IRAP picture may be the IDR or CRA picture, and may include only I slices. In the bitstream, the first picture in decoding order becomes an IRAP picture.

If an IRAP picture (IDR, CRA picture) is included in the bitstream, there may be a picture that precedes the IRAP picture in output order but follows it in decoding order. These pictures are referred to as leading pictures (LP).

Figure 12:
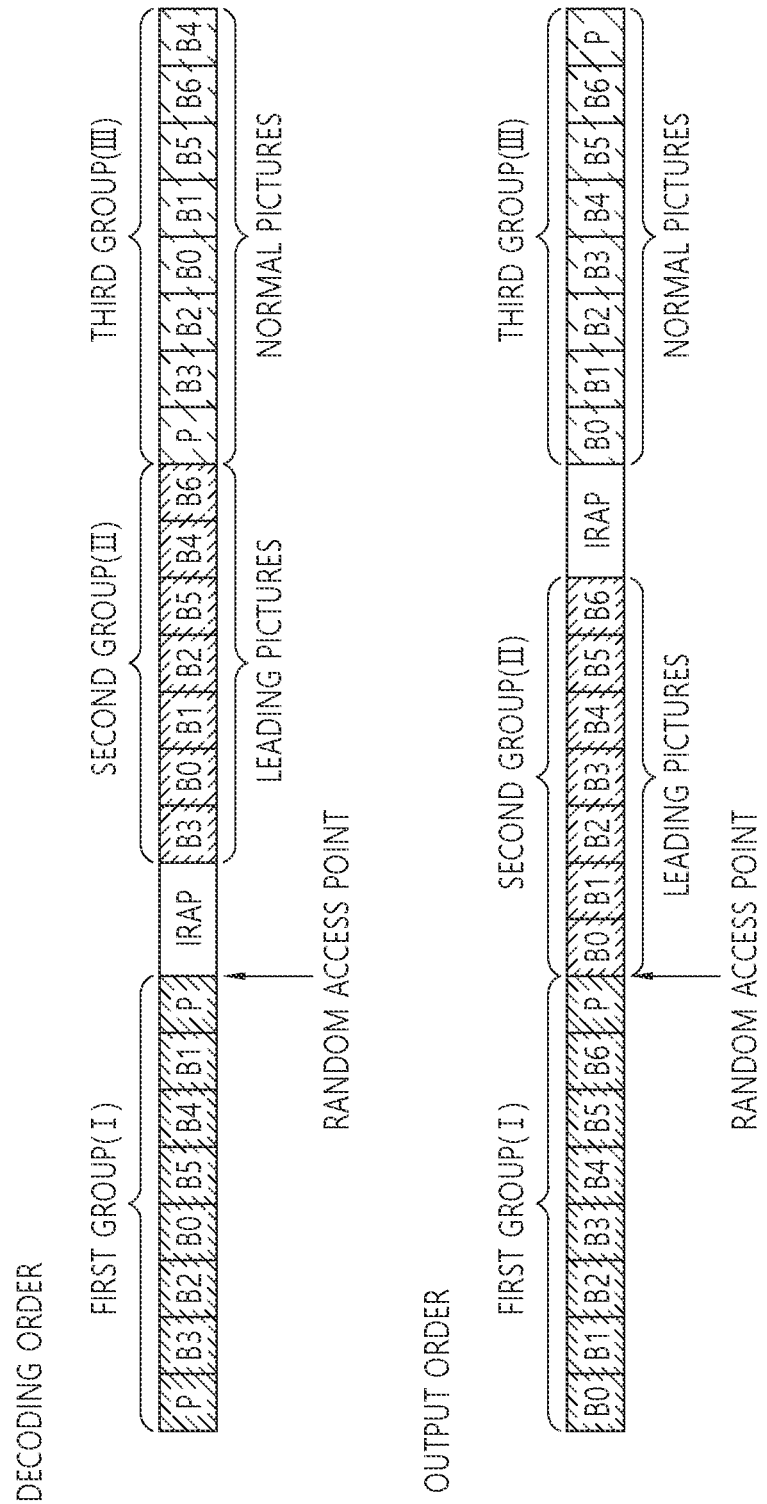
FIG. 12 is a diagram for describing a picture to which random access is possible.

FIG. 12 is a diagram for describing a picture to which random access is possible.

A picture to which random access is possible, i.e., a RAP or IRAP picture serving as a random access point, is the first picture in the decoding order in the bitstream during random access, and includes only I slices.

FIG. 12 shows an output order (or display order) and decoding order of pictures. As illustrated, an output order and a decoding order of pictures may be different from each other. For convenience, pictures are described while being divided into predetermined groups.

Pictures belonging to the first group (I) indicate pictures that precedes the IRAP picture in both output order and decoding order, and pictures belonging to the second group (II) indicate pictures that precede the IRAP picture in output order but follow it in decoding order. Pictures of the third group (III) follow the IRAP picture in both output order and decoding order.

The pictures of the first group (I) may be decoded and output regardless of the IRAP picture.

Pictures belonging to the second group (II) that are output before the IRAP picture are referred to as leading pictures, and the leading pictures may become problems in the decoding process when the TRAP picture is used as a random access point.

A picture belonging to the third group (III) which follows the IRAP picture in output order and decoding order is referred to as a normal picture. The normal picture is not used as a reference picture of the leading picture.

A random access point at which random access occurs in the bitstream becomes an IRAP picture, and as the first picture of the second group (II) is output, random access starts.

Figure 13:
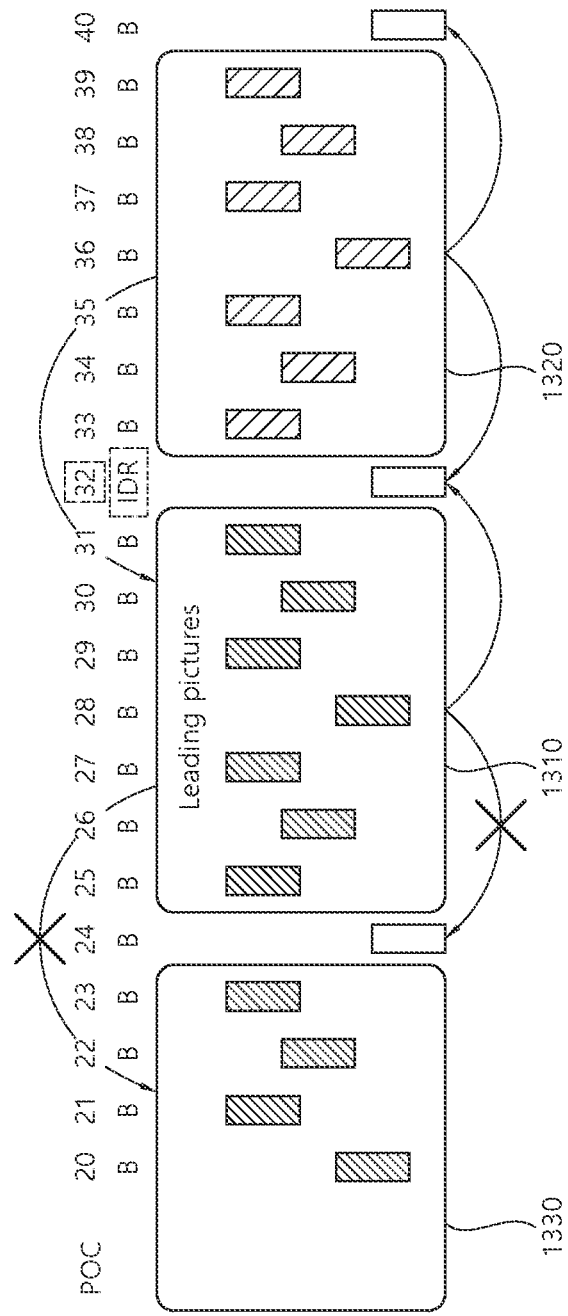
FIG. 13 is a diagram for describing an IDR picture.

FIG. 13 is a diagram for describing an IDR picture.

An IDR picture is a picture that becomes a random access point when a group of pictures has a closed structure. As described above, since the IDR picture is the IRAP picture, it includes only I slices, and may be the first picture in decoding order in the bitstream or may come in the middle of the bitstream. When the IDR picture is decoded, all reference pictures stored in a decoded picture buffer (DPB) are marked as "unused for reference".

A bar shown in FIG. 13 indicates a picture, and an arrow indicates a reference relationship with respect to whether a picture can use another picture as a reference picture. An x mark on the arrow indicates that the picture(s) cannot reference the picture indicated by the arrow.

As shown, a picture whose POC is 32 is an IDR picture. The POC is 25 to 31, and the pictures output before the IDR picture are the leading pictures 1310. The picture whose POC is 33 or more corresponds to the normal picture 1320.

Leading pictures 1310 that precede the IDR picture in output order may use a leading picture different from the IDR picture as a reference picture, but may not use the past picture 1330 that precedes the leading pictures 1310 in output order and decoding order as a reference picture.

Normal pictures 1320 that follow the IDR picture in output order and decoding order may be decoded with reference to the IDR picture, the leading picture, and other normal pictures.

Figure 14:
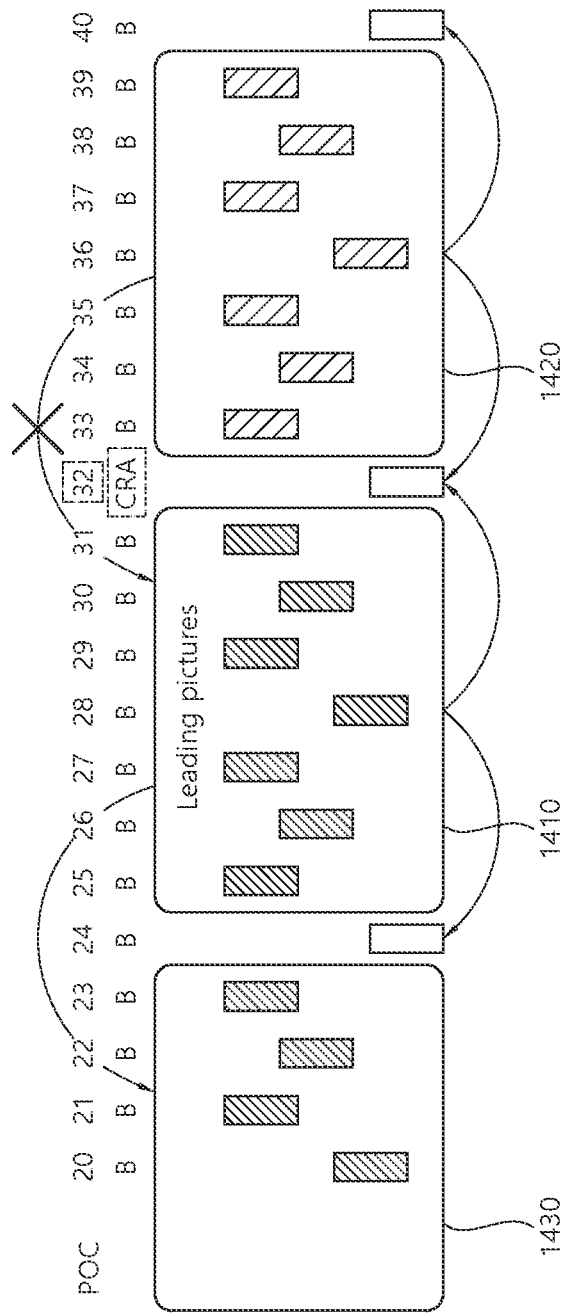
FIG. 14 is a diagram for describing a CRA picture.

FIG. 14 is a diagram for describing a CRA picture.

The CRA picture is a picture that becomes a random access point when a group of pictures has an open structure. As described above, since the CRA picture is also an IRAP picture, it includes only I slices, and may be the first picture in decoding order in the bitstream, or may come in the middle of the bitstream for normal play.

A bar shown in FIG. 14 indicates a picture, and an arrow indicates a reference relationship with respect to whether a picture can use another picture as a reference picture. An x mark on the arrow indicates that the picture or pictures cannot reference the picture indicated by the arrow.

The leading pictures 1410 that precede the CRA picture in output order may use all of the CRA picture, other leading pictures, and past pictures 1430 that precede the leading pictures 1410 in output order and decoding order as reference pictures.

Contrarily, normal pictures 1420 that follow the CRA picture in output order and decoding order may be decoded with reference to a normal picture different from the CRA picture. The normal pictures 1420 may not use the leading pictures 1410 as reference pictures.

Meanwhile, in the VVC standard, a picture being coded (i.e., a current picture) may be allowed to include slices of different NAL unit types. Whether the current picture includes slices of different NAL unit types may be indicated based on the syntax element mixed_nalu_types_in_pic_flag. For example, when the current picture includes slices of different NAL unit types, the value of the syntax element mixed_nalu_types_in_pic_flag may be expressed as 1. In this case, the current picture must reference the PPS including mixed_nalu_types_in_pic_flag having a value of 1. The semantics of the flag (mixed_nalu_types_in_pic_flag) are as follows:

When the value of the syntax element mixed_nalu_types_in_pic_flag is 1, it may be indicated that each picture referencing the PPS has one or more VCL NAL units, that the VCL NAL units do not have the same NAL unit type (nal_unit_type), and that the picture is not an IRAP picture.

When the value of the syntax element mixed_nalu_types_in_pic_flag is 0, it may be indicated that each picture referencing the PPS has one or more VCL NAL units, and that the VCL NAL unit of each picture referencing the PPS has a NAL unit type (nal_unit_type) of the same value.

When the value of no_mixed_nalu_types_in_pic_constraint_flag is 1, the value of mixed_nalu_types_in_pic_flag must be 0. The no_mixed_nalu_types_in_pic_constraint_flag syntax element indicates a constraint regarding whether a value of mixed_nalu_types_in_pic_flag for a picture must be 0. For example, based on no_mixed_nalu_types_in_pic_constraint_flag information signaled from a higher-level syntax (e.g., PPS) or a syntax including information about constraints (e.g., GCI; general constraints information), it may be determined whether the value of mixed_nalu_types_in_pic_flag must be 0.

In picture picA that also includes one or more slices having NAL unit types of different values (that is, when the value of mixed_nalu_types_in_pic_flag for picture picA is 1), for each slice having a NAL unit type value nalUnitTypeA within the range from IDR_W_RADL to CRA_NUT (e.g., in Table 1 or Table 2, the value of the NAL unit type is 7 to 9), the following may be applied.

The slice must belong to the subpicture subpicA in which the value of the corresponding subpic_treated_as_pic_flag[i] is 1. Here, subpic_treated_as_pic_flag[i] is information on whether the i-th subpicture of each picture being coded in CLVS is treated as a picture in the decoding process except for the in-loop filtering operation. For example, when the value of subpic_treated_as_pic_flag[i] is 1, it may be indicated that the i-th subpicture is treated as a picture in the decoding process except for the in-loop filtering operation. Alternatively, when the value of subpic_treated_as_pic_flag[i] is 0, it may be indicated that the i-th subpicture is not treated as a picture in a decoding process except for an in-loop filtering operation.

A slice must not belong to a subpicture of picA including a VCL NAL unit having a NAL unit type (nal_unit_type) that is not equal to nalUnitTypeA.

For all PUs that follow in CLVS in decoding order, RefPicList[0] or RefPicList[1] of slices in subpicA must not include pictures preceding picA in decoding order in the active entry.

In order to operate a concept as described above, the following may be specified. For example, the following may be applied to the VCL NAL unit of a specific picture.

When the value of mixed_nalu_types_in_pic_flag is 0, the value of the NAL unit type (nal_unit_type) must be the same for all slice NAL units being coded in the picture. A picture or PU may be considered as having the same NAL unit type as the slice NAL units that are coded in the picture or PU.

Otherwise (when the value of mixed_nalu_types_in_pic_flag is 1), one or more VCL NAL units must have a NAL unit type of a specific value within the range from IDR_W_RADL to CRA_NUT (e.g., the value of the NAL unit type in Table 1 or Table 2 is 7 to 9), and all other VCL NAL units must have the same NAL unit type as GRA_NUT or the NAL unit type of a specific value within the range from TRAIL_NUT to RSV_VCL_6 (e.g., the value of the NAL unit type in Table 1 or Table 2 is 0 to 6).

In the current VVC standard, there may be at least the following problems in the case of a picture having mixed NAL unit types.

1. When the picture includes IDR and non-IRAP NAL units, and when signaling for a reference picture list (RPL) is present in the slice header, this signaling must also be present in the header of the IDR slice(s). RPL signaling is present in the slice header of the IDR slice when the value of sps_idr_rpl_present_flag is 1. Currently, the value of this flag (sps_idr_rpl_present_flag) may be 0 even when there is one or more pictures having mixed NAL unit types. Here, the sps_idr_rpl_present_flag syntax element may indicate whether the RPL syntax element may be present in a slice header of a slice having a NAL unit type such as IDR_N_LP or IDR_W_RADL. For example, when the value of sps_idr_rpl_present_flag is 1, it may be indicated that the RPL syntax element may be present in the slice header of a slice having a NAL unit type such as IDR_N_LP or IDR_W_RADL. Alternatively, when the value of sps_idr_rpl_present_flag is 0, it may be indicated that the RPL syntax element is not present in the slice header of a slice having a NAL unit type such as IDR_N_LP or IDR_W_RADL.

2. When the current picture reference a PPS in which the value of mixed_nalu_types_in_pic_flag is 1, one or more of the VCL NAL units of the current picture must have a NAL unit type of a specific value within the range from IDR_W_RADL to CRA_NUT (e.g., the value of the NAL unit type in Table 1 or Table 2 above is 7 to 9), and all other VCL NAL units must have the same NAL unit type as GRA_NUT or the NAL unit type of a specific value within the range from TRAIL_NUT to RSV_VCL_6 (e.g., the value of the NAL unit type in Table 1 or Table 2 above is 0 to 6). This constraint is applied only to the current picture including the mixed case of IRAP and non-IRAP NAL unit types. However, it has not yet been properly applied to a picture including a mixed case of RASL/RADL and non-IRAP NAL unit types.

This document provides a solution to the above-mentioned problems. That is, as described above, a picture including two or more subpictures (i.e., a current picture) may have mixed NAL unit types. In the case of the current VVC standard, a picture having mixed NAL unit types may have a mixed form of an IRAP NAL unit type and a non-IRAP NAL unit type. However, the leading picture associated with the CRA NAL unit type may also have a form mixed with the non-IRAP NAL unit type, and a picture having this mixed NAL unit types is not supported in the current standard. Therefore, there is a need for a solution for a picture having a CRA NAL unit type and a non-IRAP NAL unit type in a mixed form.

Accordingly, this document provides a method of allowing a picture including a leading picture NAL unit type (e.g., RASL_NUT, RADL_NUT) and another non-IRAP NAL unit type (e.g., TRAIL_NUT, STSA, NUT) in a mixed form. In addition, this document defines a constraint for allowing a reference picture list to exist or to be signaled for a case in which an IDR subpicture and other non-IRAP subpictures are mixed. Accordingly, a picture having mixed NAL unit types is provided with a form mixed with not only IRAP but also CRA NAL unit to have more flexible characteristics.

For example, it may be applied as in the following embodiments, and thus the above-described problems can be solved. The embodiments below may be applied individually or in combination.

In one embodiment, when allowing a picture to have mixed NAL unit types (when the value of mixed_nal_types_in_pic_flag is 1), signaling on the reference picture list allows it for being present even for a slice having an IDR-type NAL unit type (e.g., IDR_W_RADL or IDR_N_LP). This constraint may be expressed as follows.

When at least one PPS is present which references an SPS whose value of mixed_nal_types_in_pic_flag is 1, the value of sps_idr_rpl_present_flag must become 1. This constraint may be a requirement for bitstream conformance.

Alternatively, in one embodiment, for a picture having mixed NAL unit types, a picture is allowed to include a slice having a specific NAL unit type of a leading picture (e.g., RADL or RASL) and a specific NAL unit type of a non-leading picture, non-IRAP. This may be expressed as follows.

For VCL NAL units of a specific picture, the following may be applied.

When the value of mixed_nalu_types_in_pic_flag is 0, the value of the NAL unit type (nal_unit_type) must be the same for all slice NAL units being coded in the picture. A picture or PU may be considered as having the same NAL unit type as the slice NAL units that are coded in the picture or the PU.

Otherwise (when the value of mixed_nalu_types_in_pic_flag is 1), one of the following must be satisfied (i.e., one of the following may have a value of true).

1) One or more VCL NAL units must have a NAL unit type (nal_unit_type) of a specific value within the range from IDR_W_RADL to CRA_NUT (e.g., the value of the NAL unit type in Table 1 or Table 2 above is 7 to 9), and all other VCL NAL units must have the same NAL unit type as GRA_NUT or the NAL unit type of a specific value within the range from TRAIL_NUT to RSV_VCL_6 (e.g., the value of the NAL unit type in Table 1 or Table 2 above is 0 to 6).

2) One or more VCL NAL units must all have a specific value of the same NAL unit type as RADL_NUT (e.g., in Table 1 or Table 2 above, the value of the NAL unit type is 2) or RASL_NUT (e.g., in Table 1 or Table 2 above, the value of the NAL unit type is 3), and all other VCL NAL units must have the specific value of the same NAL unit type as TRAIL_NUT (e.g., the value of the NAL unit type in Table 1 or Table 2 above is 0), STSA_NUT (e.g., the value of the NAL unit type in Table 1 or Table 2 above is 1), RSV_VCL_4 (e.g., the value of the NAL unit type in Table 1 or Table 2 above is 4), RSV_VCL_5 (e.g., the value of the NAL unit type in Table 1 or Table 2above is 5), RSV_VCL_6 (e.g., the value of the NAL unit type in Table 1 or Table 2 above is 6), or GRA_NUT.

Meanwhile, this document proposes a method of providing a picture having the above-described mixed NAL unit types even for a single-layer bitstream. As an embodiment, in the case of a single layer bitstream, the following constraint may be applied.

In the bitstream, each picture except the first picture in decoding order is considered to be associated with the previous IRAP picture in decoding order.

If the picture is the leading picture of the IRAP picture, it must be a RADL or RASL picture.

If the picture is a trailing picture of an IRAP picture, it must neither be a RADL nor RASL picture.

The RASL picture must not be present in the bitstream associated with the IDR picture.

The RADL picture must not be present in a bitstream associated with an IDR picture whose NAL unit type (nal_unit_type) is IDR_N_LP.

When referenced, and when each parameter set is available, random access can be performed at the location of the IRAP PU by discarding all PUs before the IRAP PU(and can correctly decode IRAP pictures and all subsequent non-RASL pictures in decoding order).

- The picture that precedes the IRAP picture in decoding order must precede the IRAP picture in output order and must precede the RADL picture associated with the IRAP picture in output order.
- The RASL picture associated with the CRA picture must precede the RADL picture associated with the CRA picture in the output order.
- The RASL picture associated with the CRA picture must follow in the output order the IRAP picture that precedes the CRA picture in the decoding order.
- If the value of field_seq_flag is 0 and the current picture is a leading picture associated with an IRAP picture, it must precede all non-leading pictures associated with the same IRAP picture in decoding order. Otherwise, when pictures picA and picB are first and last leading pictures associated with IRAP pictures in decoding order, respectively, there must be at most one non-leading picture preceding picA in decoding order, and there must be no non-leading picture between picA and picB in decoding order.

The following drawings were prepared to explain a specific example of the present document. Since the names or specific terms, or names of specific devices described in the drawings (e.g., names of syntax/syntax elements, etc.) are presented as examples, the technical features of the present document are not limited to the specific names used in the following drawings.

Figure 15:
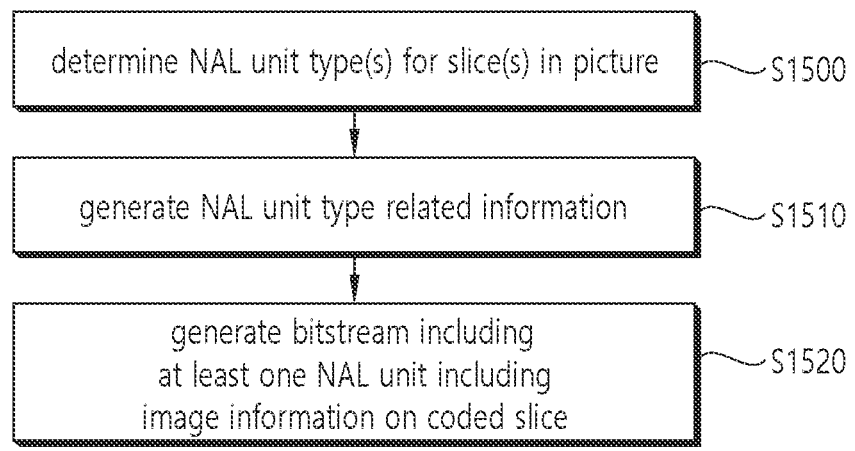
FIG. 15 schematically represents an example of a video/image encoding method to which the embodiment(s) of this document are applicable.

FIG. 15 schematically represents an example of a video/image encoding method to which the embodiment(s) of this document are applicable. The method disclosed in FIG. 15 may be performed by the encoding apparatus 200 disclosed in FIG. 2.

Referring to FIG. 15, the encoding apparatus may determine NAL unit type(s) for slice(s) in a picture (S1500).

For example, the encoding apparatus may determine the NAL unit type according to the nature, kind and the like of a picture or subpicture as described in Tables 1 and 2 above, and based on the NAL unit type of the picture or subpicture, the NAL unit type for each slice may be determined.

For example, when the value of mixed_nalu_types_in_pic_flag is 0, slices in the picture associated with the PPS may be determined as the same NAL unit type. That is, when the value of mixed_nalu_types_in_pic_flag is 0, the NAL unit type defined in the first NAL unit header of the first NAL unit including information on the first slice of the picture is the same as the NAL unit type defined in the second NAL unit header of the second NAL unit including information on the second slice of the same picture. Alternatively, for a case where the value of mixed_nalu_types_in_pic_flag is 1, slices in the picture associated with the PPS may be determined as different NAL unit types. Here, NAL unit types for slices in a picture may be determined based on the method proposed in the above-described embodiments.

The encoding apparatus may generate NAL unit type related information (S1510). The NAL unit type related information may include information/syntax elements related to the NAL unit type described in the above-described embodiments and/or Tables 1 and 2 above. For example, the information related to the NAL unit type may include a mixed_nalu_types_in_pic_flag syntax element included in the PPS. In addition, information related to the NAL unit type may include a nal_unit_type syntax element in a NAL unit header of a NAL unit including information on a coded slice.

The encoding apparatus may generate a bitstream (S1520). The bitstream may include at least one NAL unit including image information on a coded slice. Also, the bitstream may include a PPS.

Figure 16:
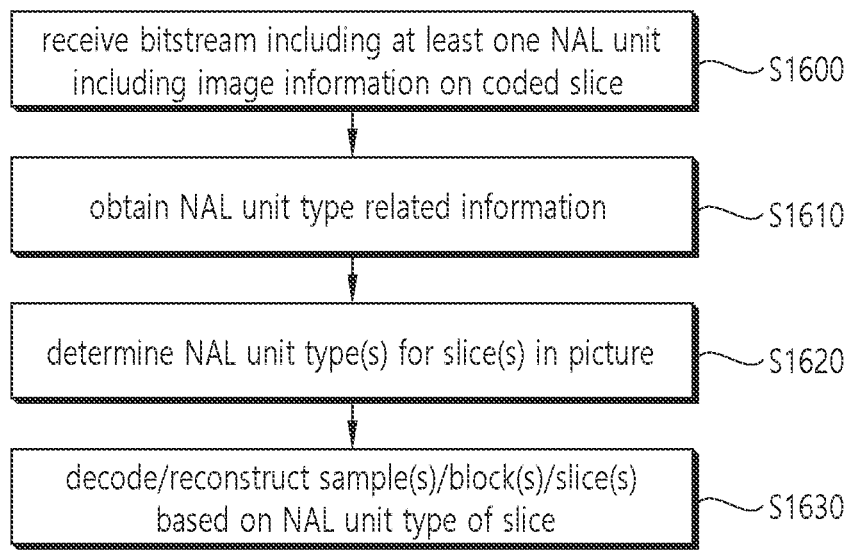
FIG. 16 schematically represents an example of a video/image decoding method to which the embodiment(s) of this document are applicable.

FIG. 16 schematically represents an example of a video/image decoding method to which the embodiment(s) of this document are applicable. The method disclosed in FIG. 16 may be performed by the decoding apparatus 300 disclosed in FIG. 3.

Referring to FIG. 16, the decoding apparatus may receive a bitstream (S1600). Here, the bitstream may include at least one NAL unit including image information on a coded slice. Also, the bitstream may include a PPS.

The decoding apparatus may obtain NAL unit type related information (S1610). The NAL unit type related information may include information/syntax elements related to the NAL unit type described in the above-described embodiments and/or Tables 1 and 2 above. For example, the information related to the NAL unit type may include a mixed_nalu_types_in_pic_flag syntax element included in the PPS. In addition, information related to the NAL unit type may include a nal_unit_type syntax element in a NAL unit header of a NAL unit including information on a coded slice.

The decoding apparatus may determine the NAL unit type(s) for the slice(s) in the picture (S1620).

For example, when the value of mixed_nalu_types_in_pic_flag is 0, slices in the picture associated with the PPS use the same NAL unit type. That is, when the value of mixed_nalu_types_in_pic_flag is 0, the NAL unit type defined in the first NAL unit header of the first NAL unit including information on the first slice of the picture is the same as the NAL unit type defined in the second NAL unit header of the second NAL unit including information on the second slice of the same picture. Alternatively, when the value of mixed_nalu_types_in_pic_flag is 1, slices in the picture associated with the PPS use different NAL unit types. Here, NAL unit types for slices in a picture may be determined based on the method proposed in the above-described embodiments.

The decoding apparatus may decode/reconstruct the sample(s)/block(s)/slice(s) based on the NAL unit type of the slice (S1630). Sample(s)/block(s) in a slice may be decoded/reconstructed based on the NAL unit type of the slice.

For example, when the first NAL unit type is set for the first slice of the current picture and the second NAL unit type (different from the first NAL unit type) is set for the second slice of the current picture, the sample(s)/block(s) in the first slice or the first slice itself may be decoded/reconstructed based on the first NAL unit type, and the sample(s)/block(s) in the second slice or the second slice itself may be decoded/reconstructed based on the second NAL unit type.

Figure 17:
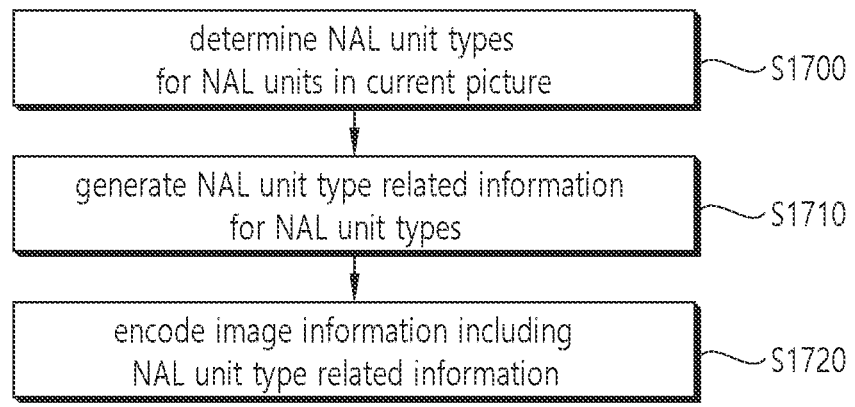
FIGS. 17 and 18 schematically illustrate a video/image encoding method and an example of related components according to embodiment(s) of the present document.
Figure 18:
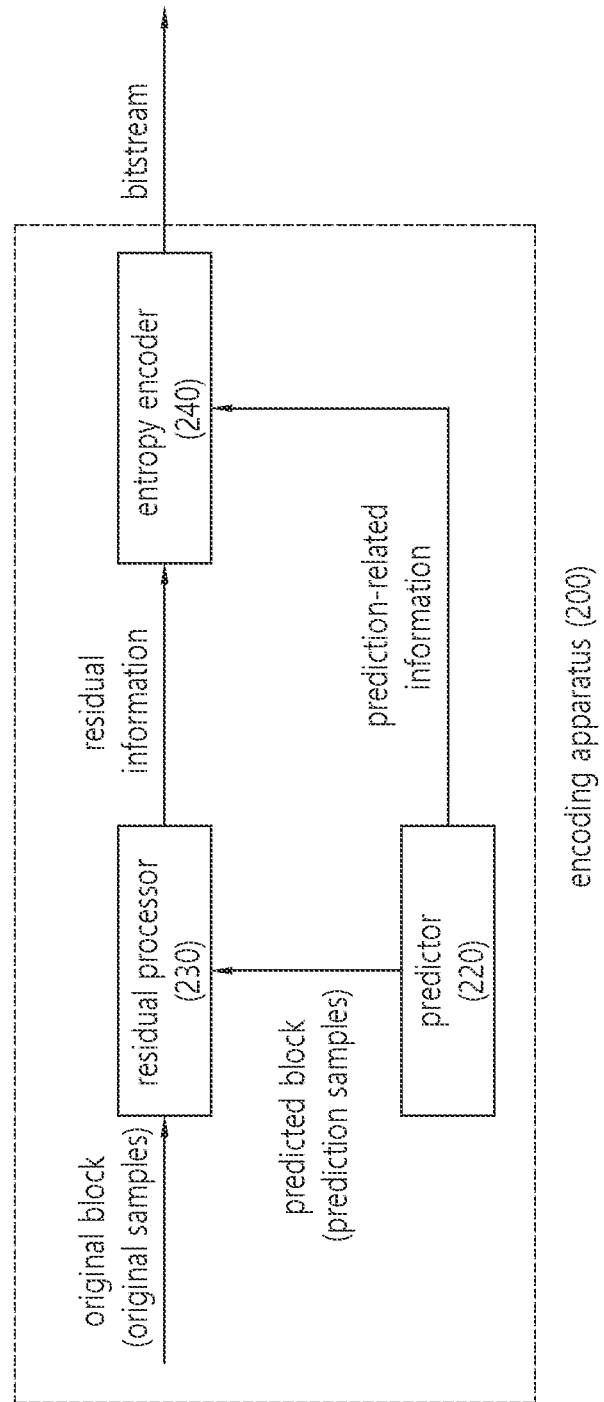

FIGS. 17 and 18 schematically represent an example of a video/image encoding method and associated components according to the embodiment(s) of this document.

The method disclosed in FIG. 17 may be performed by the encoding apparatus 200 disclosed in FIG. 2 or FIG. 18. Here, the encoding apparatus 200 disclosed in FIG. 18 is a simplified representation of the encoding apparatus 200 disclosed in FIG. 2. Specifically, steps S1700 to S1720 of FIG. 17 may be performed by the entropy encoder 240 disclosed in FIG. 2, and in addition, according to an embodiment, each step may be performed by the image partitioner 210, the predictor 220, the residual processor 230, the adder 340, and the like disclosed in FIG. 2. In addition, the method disclosed in FIG. 17 may be performed including the embodiments described above in this document. Accordingly, in FIG. 17, a detailed description of contents corresponding to the repetition of the above-described embodiments will be omitted or simplified.

Referring to FIG. 17, the encoding apparatus may determine NAL unit types for NAL units in a current picture (S1700).

The current picture may include a plurality of slices, and one slice may include a slice header and slice data. In addition, a NAL unit may be generated by adding a NAL unit header to a slice (a slice header and slice data). The NAL unit header may include NAL unit type information specified according to slice data included in the corresponding NAL unit.

As an embodiment, the encoding apparatus may generate the first NAL unit for the first slice in the current picture and the second NAL unit for the second slice in the current picture. Additionally, the encoding apparatus may determine the first NAL unit type for the first slice and the second NAL unit type for the second slice according to the types of the first and second slices.

For example, the NAL unit type may include TRAIL_NUT, STSA_NUT, RADL_NUT, RASL_NUT, IDR_W_RADL, IDR_N_LP, CRA_NUT, and the like based on the type of slice data included in the NAL unit as shown in Table 1 or Table 2 above. Further, the NAL unit type may be signaled based on the nal_unit_type syntax element in the NAL unit header. The nal_unit_type syntax element is syntax information for specifying a NAL unit type, and as shown in Table 1 or Table 2 above, may be represented as a specific value corresponding to a specific NAL unit type.

The encoding apparatus may generate NAL unit type related information for NAL unit types (S1710).

The NAL unit type related information may include information/syntax elements related to the NAL unit type described in the above-described embodiments and/or Tables 1 and 2 above. For example, the NAL unit type related information may be information regarding whether the current picture has mixed NAL unit types, and may be represented by a mixed_nalu_types_in_pic_flag syntax element included in the PPS. For example, when the value of the mixed_nalu_types_in_pic_flag syntax element is 0, it may be indicated that NAL units in the current picture have the same NAL unit type. Alternatively, when the value of the mixed_nalu_types_in_pic_flag syntax element is 1, it may be indicated that NAL units in the current picture have different NAL unit types.

As an embodiment, when all NAL unit types for NAL units in the current picture are the same, the encoding apparatus may generate NAL unit type related information (e.g., mixed_nalu_types_in_pic_flag) having a value of 0. Alternatively, when NAL unit types for NAL units in the current picture are not the same, the encoding apparatus may generate NAL unit type related information (e.g., mixed_nalu_types_in_pic_flag) having a value of 1.

That is, based on NAL unit type related information about the current picture having mixed NAL unit types (e.g., the value of mixed_nalu_types_in_pic_flag is 1), the first NAL unit for the first slice of the current picture and the second NAL unit for the second slice of the current picture may have different NAL unit types. Alternatively, based on NAL unit type related information about the current picture having no mixed NAL unit types (e.g., the value of mixed_nalu_types_in_pic_flag is 0), the first NAL unit for the first slice of the current picture and the second NAL unit for the second slice of the current picture may have the same NAL unit types.

As an example, based on NAL unit type related information about the current picture having mixed NAL unit types (e.g., a value of mixed_nalu_types_in_pic_flag is 1), the first NAL unit for the first slice may have a leading picture NAL unit type, and the second NAL unit for the second slice may have a non-IRAP NAL unit type or a non-leading picture NAL unit type. Here, the leading picture NAL unit type may include a RADL NAL unit type or a RASL NAL unit type, and the non-IRAP NAL unit type or non-leading picture NAL unit type may include a trail NAL unit type or an STSA NAL unit type.

Alternatively, as an example, based on NAL unit type related information about the current picture having mixed NAL unit types (e.g., a value of mixed_nalu_types_in_pic_flag is 1), the first NAL unit for the first slice may have a IRAP NAL unit type, and the second NAL unit for the second slice may have a non-IRAP NAL unit type or a non-leading picture NAL unit type. Here, the IRAP NAL unit type may include an IDR NAL unit type (i.e., IDR_N_LP NAL or IDR_W_RADL NAL unit type) or a CRA NAL unit type, and non-IRAP NAL unit type or non-leading picture NAL unit type may include a trail NAL unit type or STSA NAL unit type. Also, according to an embodiment, the non-IRAP NAL unit type or the non-leading picture NAL unit type may refer to only the trail NAL unit type.

According to an embodiment, based on a case of allowing the current picture to have mixed NAL unit types, for a slice having an IDR NAL unit type (e.g., IDR_W_RADL or IDR_N_LP) in the current picture, information related to signaling a reference picture list must be present. The information related to signaling the reference picture list may indicate information on whether a syntax element for signaling of the reference picture list is present in a slice header of a slice. That is, based on the value of the information related to signaling the reference picture list being 1, the syntax element for the signaling of the reference picture list may be present in the slice header of the slice having the IDR NAL unit type. Alternatively, based on the value of the information related to signaling the reference picture list being 0, the syntax element for the signaling of the reference picture list may not be present in the slice header of the slice having the IDR NAL unit type.

For example, the information related to signaling the reference picture list may be the above-described sps_idr_rpl_present_flag syntax element. When the value of sps_idr_rpl_present_flag is 1, it may be indicated that the syntax element for signaling of a reference picture list may be present in a slice header of a slice having a NAL unit type such as IDR_N_LP or IDR_W_RADL. Alternatively, when the value of sps_idr_rpl_present_flag is 0, it may be indicated that the syntax element for signaling of a reference picture list may not be present in a slice header of a slice having a NAL unit type such as IDR_N_LP or IDR_W_RADL.

The encoding apparatus may encode image/video information including NAL unit type related information (S1720).

For example, when the first NAL unit for the first slice in the current picture and the second NAL unit for the second slice in the current picture have different NAL unit types, the encoding apparatus may encode image/video information including NAL unit type related information (e.g., mixed_nalu_types_in_pic_flag) having a value of 1. Alternatively, when the first NAL unit for the first slice in the current picture and the second NAL unit for the second slice in the current picture have the same NAL unit type, the encoding apparatus may encode image/video information including NAL unit type related information (e.g., mixed_nalu_types_in_pic_flag) having a value of 0.

Additionally, for example, the encoding apparatus may encode image/video information including nal_unit_type information indicating each NAL unit type for slices in the current picture.

Also, for example, the encoding apparatus may encode image/video information including information related to signaling the reference picture list (e.g., sps_idr_rpl_present_flag).

Also, for example, the encoding apparatus may encode image/video information including NAL units for slices in the current picture.

The image/video information including various informations as described above may be encoded and output in the form of a bitstream. The bitstream may be transmitted to the decoding apparatus through a network or a (digital) storage medium. Here, the network may include a broadcast network, a communication network and/or the like, and the digital storage medium may include various storage media, such as a universal serial bus (USB), secure digital (SD), a compact disk (CD), a digital video disk (DVD), Blu-ray, a hard disk drive (HDD), a solid state drive (SSD), and the like.

Figure 19:
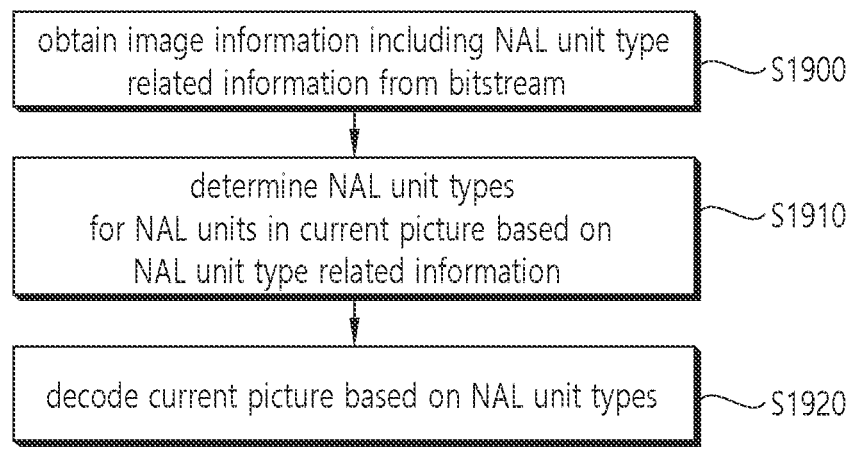
FIGS. 19 and 20 schematically illustrate a video/image decoding method and an example of related components according to embodiment(s) of the present document
Figure 20:
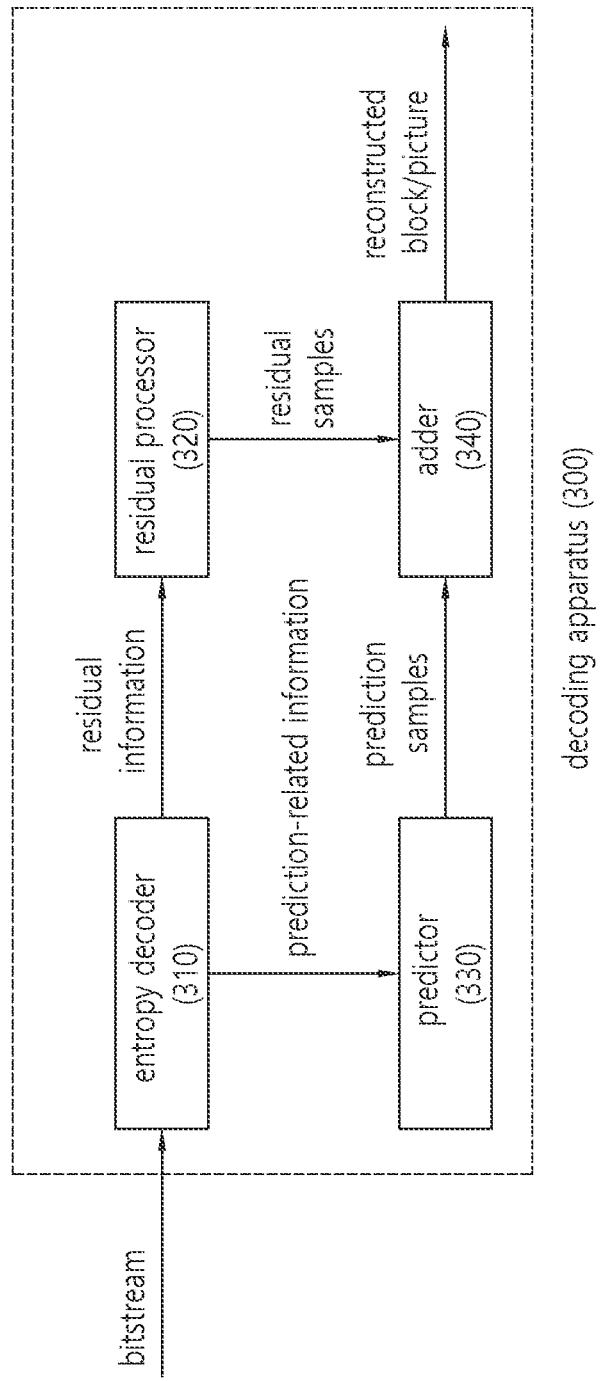

FIGS. 19 and 20 schematically represent an example of a video/image decoding method and associated components according to the embodiment(s) of this document.

The method disclosed in FIG. 19 may be performed by the decoding apparatus 300 disclosed in FIG. 3 or 20. Here, the decoding apparatus 300 disclosed in FIG. 20 is a simplified representation of the decoding apparatus 300 disclosed in FIG. 3. Specifically, steps S1900 to S1920 of FIG. 19 may be performed by the entropy encoder 310 disclosed in FIG. 3, and in addition, according to an embodiment, each step may be performed by the residual processor 320, the predictor 330, the adder 340, and the like disclosed in FIG. 3. In addition, the method disclosed in FIG. 19 may be performed including the embodiments described above in this document. Accordingly, in FIG. 19, a detailed description of contents corresponding to the repetition of the above-described embodiments will be omitted or simplified.

Referring to FIG. 19, the decoding apparatus may obtain image/video information including NAL unit type related information from a bitstream (S1900).

For example, the decoding apparatus may parse the bitstream, and derive information (e.g., video/image information) required for image reconstruction (or picture reconstruction). In this case, the image information may include the above-described NAL unit type related information (e.g., mixed_nalu_types_in_pic_flag), the nal_unit_type information indicating each NAL unit type for slices in the current picture, information related to signaling a reference picture list (e.g., sps_idr_rpl_present_flag), a NAL unit for slices within the current picture, and the like. That is, the image information may include various information required in the decoding process, and may be decoded based on a coding method such as exponential Golomb coding, CAVLC, or CABAC.

As described above, the NAL unit type related information may include information/syntax elements related to the NAL unit type described in the above-described embodiments and/or Tables 1 and 2 above. For example, the NAL unit type related information may be information regarding whether the current picture has mixed NAL unit types, and may be represented by a mixed_nalu_types_in_pic_flag syntax element included in the PPS. For example, when the value of the mixed_nalu_types_in_pic_flag syntax element is 0, it may be indicated that NAL units in the current picture have the same NAL unit type. Alternatively, when the value of the mixed_nalu_types_in_pic_flag syntax element is 1, it may be indicated that NAL units in the current picture have different NAL unit types.

The decoding apparatus may determine NAL unit types for NAL units in the current picture based on NAL unit type related information (S1910).

The current picture may include a plurality of slices, and one slice may include a slice header and slice data. In addition, a NAL unit may be generated by adding a NAL unit header to a slice (a slice header and slice data). The NAL unit header may include NAL unit type information specified according to slice data included in the corresponding NAL unit.

For example, the NAL unit type may include TRAIL_NUT, STSA_NUT, RADL_NUT, RASL_NUT, IDR_W_RADL, IDR_N_LP, CRA_NUT, and the like based on the type of slice data included in the NAL unit as shown in Table 1 or Table 2 above. Further, the NAL unit type may be signaled based on the nal_unit_type syntax element in the NAL unit header. The nal_unit_type syntax element is syntax information for specifying a NAL unit type, and as shown in Table 1 or Table 2 above, may be represented as a specific value corresponding to a specific NAL unit type.

In an embodiment, the decoding apparatus may determine that, based on NAL unit type related information about the current picture having mixed NAL unit types (e.g., the value of mixed_nalu_types_in_pic_flag is 1), the first NAL unit for the first slice of the current picture and the second NAL unit for the second slice of the current picture may have different NAL unit types. Alternatively, the decoding apparatus may determine that, based on NAL unit type related information about the current picture having no mixed NAL unit types (e.g., the value of mixed_nalu_types_in_pic_flag is 0), the first NAL unit for the first slice of the current picture and the second NAL unit for the second slice of the current picture may have the same NAL unit types.

As an example, based on NAL unit type related information about the current picture having mixed NAL unit types (e.g., a value of mixed_nalu_types_in_pic_flag is 1), the first NAL unit for the first slice may have a leading picture NAL unit type, and the second NAL unit for the second slice may have a non-IRAP NAL unit type or a non-leading picture NAL unit type. Here, the leading picture NAL unit type may include a RADL NAL unit type or a RASL NAL unit type, and the non-IRAP NAL unit type or non-leading picture NAL unit type may include a trail NAL unit type or an STSA NAL unit type.

Alternatively, as an example, based on NAL unit type related information about the current picture having mixed NAL unit types (e.g., a value of mixed_nalu_types_in_pic_flag is 1), the first NAL unit for the first slice may have a IRAP NAL unit type, and the second NAL unit for the second slice may have a non-IRAP NAL unit type or a non-leading picture NAL unit type. Here, the IRAP NAL unit type may include an IDR NAL unit type (i.e., IDR_N_LP NAL or IDR_W_RADL NAL unit type) or a CRA NAL unit type, and non-IRAP NAL unit type or non-leading picture NAL unit type may include a trail NAL unit type or STSA NAL unit type. Also, according to an embodiment, the non-IRAP NAL unit type or the non-leading picture NAL unit type may refer to only the trail NAL unit type.

According to an embodiment, based on a case of allowing the current picture to have mixed NAL unit types, for a slice having an IDR NAL unit type (e.g., IDR_W_RADL or IDR_N_LP) in the current picture, information related to signaling a reference picture list must be present. The information related to signaling the reference picture list may indicate information on whether a syntax element for signaling of the reference picture list is present in a slice header of a slice. That is, based on the value of the information related to signaling the reference picture list being 1, the syntax element for the signaling of the reference picture list may be present in the slice header of the slice having the IDR NAL unit type. Alternatively, based on the value of the information related to signaling the reference picture list being 0, the syntax element for the signaling of the reference picture list may not be present in the slice header of the slice having the IDR NAL unit type.

For example, the information related to signaling the reference picture list may be the above-described sps_idr_rpl_present_flag syntax element. When the value of sps_idr_rpl_present_flag is 1, it may be indicated that the syntax element for signaling of a reference picture list may be present in a slice header of a slice having a NAL unit type such as IDR_N_LP or IDR_W_RADL. Alternatively, when the value of sps_idr_rpl_present_flag is 0, it may be indicated that the syntax element for signaling of a reference picture list may not be present in a slice header of a slice having a NAL unit type such as IDR_N_LP or IDR_W_RADL.

The decoding apparatus may decode/reconstruct the current picture based on the NAL unit types (S1920).

For example, for the first slice in the current picture determined as the first NAL unit type and the second slice in the current picture determined as the second NAL unit type, the decoding apparatus may decode/restore the first slice based on the first NAL unit type and decode/reconstruct the second slice based on the second NAL unit type. In addition, the decoding apparatus may decode/reconstruct the sample(s)/block(s) in the first slice based on the first NAL unit type, and decode/reconstruct the sample(s)/block(s) in the second slice based on the second NAL unit type.

Although methods have been described on the basis of a flowchart in which steps or blocks are listed in sequence in the above-described embodiments, the steps of the present document are not limited to a certain order, and a certain step may be performed in a different step or in a different order or concurrently with respect to that described above. Further, it will be understood by those ordinary skilled in the art that the steps of the flowcharts are not exclusive, and another step may be included therein or one or more steps in the flowchart may be deleted without exerting an influence on the scope of the present document.

The aforementioned method according to the present disclosure may be in the form of software, and the encoding apparatus and/or decoding apparatus according to the present document may be included in a device for performing image processing, for example, a TV, a computer, a smart phone, a set-top box, a display device, or the like.

When the embodiments of the present document are implemented by software, the aforementioned method may be implemented by a module (process or function) which performs the aforementioned function. The module may be stored in a memory and executed by a processor. The memory may be installed inside or outside the processor and may be connected to the processor via various well-known means. The processor may include Application-Specific Integrated Circuit (ASIC), other chipsets, a logical circuit, and/or a data processing device. The memory may include a Read-Only Memory (ROM), a Random Access Memory (RAM), a flash memory, a memory card, a storage medium, and/or other storage device. In other words, the embodiments according to the present document may be implemented and executed on a processor, a micro-processor, a controller, or a chip. For example, functional units illustrated in the respective figures may be implemented and executed on a computer, a processor, a microprocessor, a controller, or a chip. In this case, information on implementation (for example, information on instructions) or algorithms may be stored in a digital storage medium.

Further, the decoding apparatus and the encoding apparatus to which the present document is applied may be included in a multimedia broadcasting transceiver, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an over the top (OTT) video device, an Internet streaming service providing device, a three-dimensional (3D) video device, a virtual reality (VR) device, an augmented reality (AR: argumente reality) device, a video telephony video device, a transportation means terminal (e.g., a vehicle (including an autonomous vehicle) terminal, an aircraft terminal, a ship terminal, etc.) and a medical video device, and may be used to process a video signal or a data signal. For example, the over the top (OTT) video device may include a game console, a Blu-ray player, an Internet access TV, a home theater system, a smart phone, a tablet PC, a digital video recorder (DVR) and the like.

In addition, the processing method to which the embodiment(s) of the present document is applied may be produced in the form of a program executed by a computer and may be stored in a computer-readable recording medium. Multimedia data having a data structure according to the embodiment(s) of the present document may also be stored in the computer-readable recording medium. The computer readable recording medium includes all kinds of storage devices and distributed storage devices in which computer readable data is stored. The computer-readable recording medium may include, for example, a Bluray disc (BD), a universal serial bus (USB), a ROM, a PROM, an EPROM, an EEPROM, a RAM, a CD-ROM, a magnetic tape, a floppy disk, and an optical data storage device. The computer-readable recording medium also includes media embodied in the form of a carrier wave (for example, transmission over the Internet). In addition, a bitstream generated by the encoding method may be stored in the computer-readable recording medium or transmitted through a wired or wireless communication network.

In addition, the embodiment(s) of the present document may be embodied as a computer program product based on a program code, and the program code may be executed on a computer according to the embodiment(s) of the present document. The program code may be stored on a computer-readable carrier.

Figure 21:
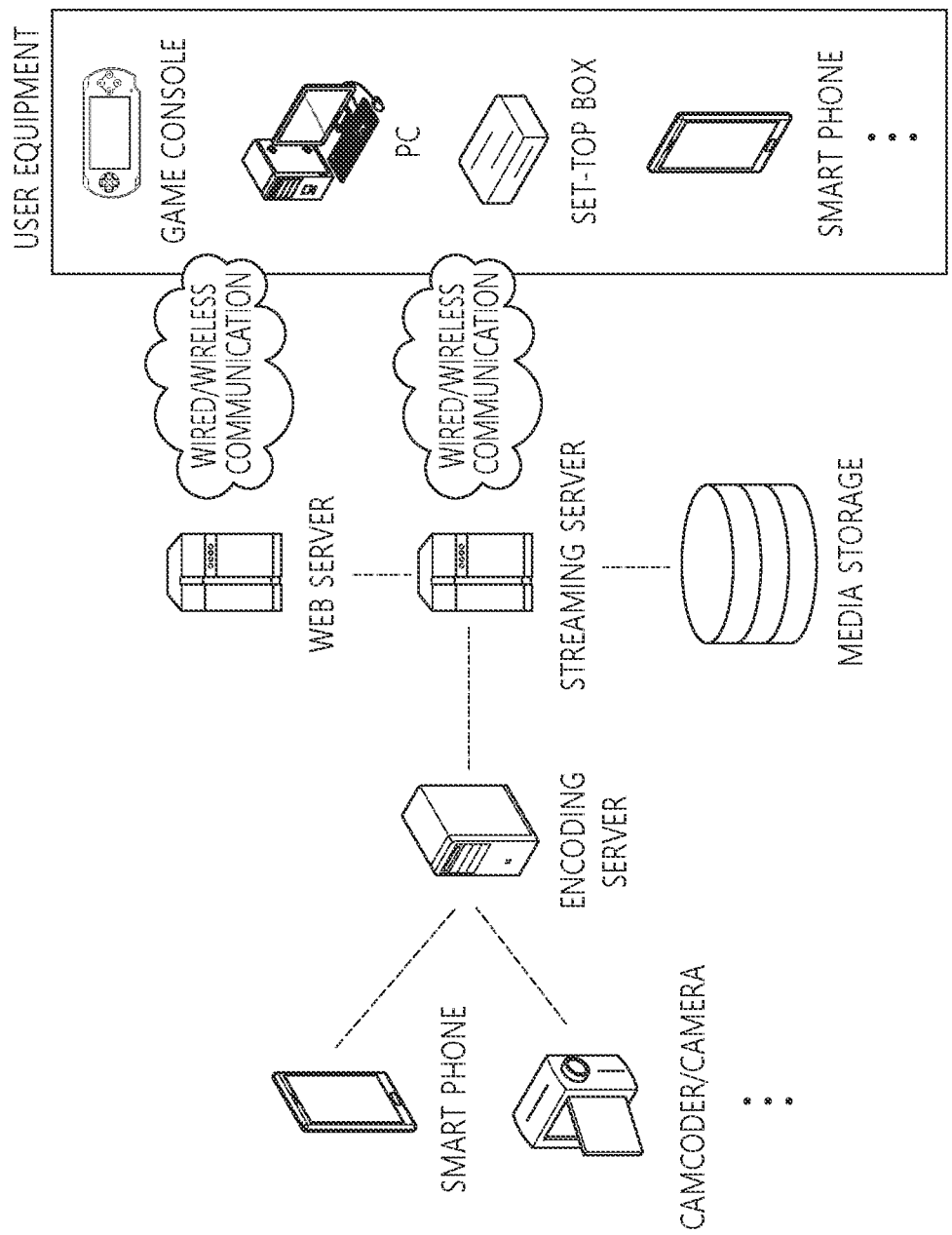
FIG. 21 illustrates an example of a content streaming system to which embodiments disclosed in the present document are applicable.

FIG. 21 represents an example of a contents streaming system to which the embodiment of the present document may be applied.

Referring to FIG. 21, the content streaming system to which the embodiments of the present document is applied may generally include an encoding server, a streaming server, a web server, a media storage, a user device, and a multimedia input device.

The encoding server functions to compress to digital data the contents input from the multimedia input devices, such as the smart phone, the camera, the camcorder and the like, to generate a bitstream, and to transmit it to the streaming server. As another example, in a case where the multimedia input device, such as, the smart phone, the camera, the camcorder or the like, directly generates a bitstream, the encoding server may be omitted.

The bitstream may be generated by an encoding method or a bitstream generation method to which the embodiments of the present document is applied. And the streaming server may temporarily store the bitstream in a process of transmitting or receiving the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipment in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like.

Each of servers in the contents streaming system may be operated as a distributed server, and in this case, data received by each server may be processed in distributed manner.

Claims in the present document can be combined in a various way. For example, technical features in method claims of the present document can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. An image decoding method performed by a decoding apparatus, the method comprising:
    obtaining image information including network abstraction layer (NAL) unit type related information from a bitstream;
    determining NAL unit types for NAL units in a current picture based on the NAL unit type related information; and
    decoding the current picture based on the NAL unit types,
    wherein the NAL unit type related information is information on whether the current picture has mixed NAL unit types,
    wherein the image information further includes NAL unit type constraint information to restrict the NAL unit type related information from having the mixed NAL unit types,
    wherein the NAL unit type related information is determined based on the NAL unit type constraint information,
    wherein based on the NAL unit type related information for the current picture having the mixed NAL unit types, a first NAL unit type for a first slice of the current picture is different from a second NAL unit type for a second slice of the current picture,
    wherein based on the first NAL unit type being an instantaneous decoding refresh (IDR) NAL unit type, a value of information related to signaling a reference picture list is equal to 1, and
    wherein based on the value of the information related to signaling the reference picture list being equal to 1, a syntax element for the signaling of the reference picture list is present in a slice header of the first slice having the IDR NAL unit type.

2. An image encoding method performed by an encoding apparatus, the method comprising:
    determining NAL unit types for NAL units in a current picture;
    generating NAL unit type related information based on the NAL unit types; and
    encoding image information including the NAL unit type related information,
    wherein the NAL unit type related information is information on whether the current picture has mixed NAL unit types,
    wherein the image information further includes NAL unit type constraint information to restrict the NAL unit type related information from having the mixed NAL unit types,
    wherein the NAL unit type related information is generated based on the NAL unit type constraint information,
    wherein based on the NAL unit type related information for the current picture having the mixed NAL unit types, a first NAL unit type for a first slice of the current picture is different from a second NAL unit type for a second slice of the current picture have different NAL unit types, and
    wherein based on the first NAL unit type being an instantaneous decoding refresh (IDR) NAL unit type, a syntax element for signaling of a reference picture list is present in a slice header of the first slice having the IDR NAL unit type.

3. The method of claim 1, wherein based on the NAL unit type related information for the current picture having the mixed NAL unit types and the first NAL unit type being the IDR NAL unit type, the second NAL unit type is a TRAIL NAL unit type.

4. The method of claim 2, wherein based on the NAL unit type related information for the current picture having the mixed NAL unit types and the first NAL unit type being the IDR NAL unit type, the second NAL unit type is a TRAIL NAL unit type.

5. A transmission method of data for an image, the method comprising:
    obtaining a bitstream of the image, wherein the bitstream is generated based on determining NAL unit types for NAL units in a current picture, generating NAL unit type related information based on the NAL unit types, and encoding image information including the NAL unit type related information; and transmitting the data comprising the bitstream, wherein the NAL unit type related information is information on whether the current picture has mixed NAL unit types, wherein the image information further includes NAL unit type constraint information to restrict the NAL unit type related information from having the mixed NAL unit types, wherein the NAL unit type related information is generated based on the NAL unit type constraint information, wherein based on the NAL unit type related information for the current picture having the mixed NAL unit types, a first NAL unit type for a first slice of the current picture is different from a second NAL unit type for a second slice of the current picture have different NAL unit types, and wherein based on the first NAL unit type being an instantaneous decoding refresh (IDR) NAL unit type, a syntax element for signaling of a reference picture list is present in a slice header of the first slice having the IDR NAL unit type.

\* \* \* \* \*